United States Patent
Soeno et al.

(10) Patent No.: US 6,246,552 B1
(45) Date of Patent: Jun. 12, 2001

(54) READ/WRITE HEAD INCLUDING DISPLACEMENT GENERATING MEANS THAT ELONGATES AND CONTRACTS BY INVERSE PIEZOELECTRIC EFFECT OF ELECTROSTRICTIVE EFFECT

(75) Inventors: Yoshikazu Soeno; Shinji Ichikawa; Takamitsu Tsuna, all of Chiba; Isamu Sato, Tokyo, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/091,363

(22) PCT Filed: Sep. 30, 1997

(86) PCT No.: PCT/JP97/03486

§ 371 Date: Sep. 24, 1998

§ 102(e) Date: Sep. 24, 1998

(87) PCT Pub. No.: WO98/19304

PCT Pub. Date: May 7, 1998

(30) Foreign Application Priority Data

Oct. 31, 1996 (JP) .................................................. 8-305621
May 16, 1997 (JP) .................................................. 9-143183

(51) Int. Cl.$^7$ ................................................. G11B 21/10
(52) U.S. Cl. ............................................................ 360/294.4
(58) Field of Search .................................. 360/103, 104, 360/109, 294.4

(56) References Cited

U.S. PATENT DOCUMENTS

| | | | |
|---|---|---|---|
| 4,605,977 | * | 8/1986 | Matthews .............................. 360/103 |
| 4,700,250 | * | 10/1987 | Kuriyama ............................. 360/104 |
| 4,724,500 | * | 2/1988 | Dalziel ................................. 360/103 |

FOREIGN PATENT DOCUMENTS 63-291271    11/1988  (JP) .

(List continued on next page.)

OTHER PUBLICATIONS

Long–Sheng Fan, et al., IEEE Transactions on Industrial Electronics, vol. 42, No. 3, pp. 222–233, "Magnetic Recording Head Positioning at Very High Track Densities Using a Microactuator–Based, Two–Stage Servo System", Jun. 1995.

Denny K. Miu, et al., IEEE Control Systems, pp. 52–57, "Silicon Microstructures and Microactuators for Compact Computer Disk Drives", Dec. 1994.

*Primary Examiner*—David Davis
(74) *Attorney, Agent, or Firm*—Oblon, Spivak, McClelland, Maier & Neustadt, P.C.

(57) ABSTRACT

A read/write head includes a slider provided with an electromagnetic transducer element (or an optical module), an actuator, and a suspension. The actuator includes a fixed part, a movable part, and at least two beam members for coupling them together. The beam members have a displacement generating means that elongates and contracts by inverse piezoelectric effect or electrostrictive effect. The fixed part is fixed to the suspension, and the movable part is fixed to the slider. Upon the elongation and contraction of the displacement generator, the displacement generator deflects and the movable part displaces linearly, circularly or rotationally with respect to the fixed part, and the electromagnetic transducer element displaces in a linear or circular orbit, so that the electromagnetic transducer element intersects recording tracks. In the actuator, the fixed part, movable part and beam members are formed as an integrated single piece by providing a hole and/or a cutout in a sheet-like member constructed of a piezoelectric or electrostrictive material. The actuator of the structure illustrated is used for the positioning of a direction intersecting recording tracks. In this case, the total sum of voltages applied on the displacement generating means is controlled in such a manner that it is constant at any time, thereby controlling position fluctuations of the electromagnetic transducer element in the direction vertical to the recording medium surface.

20 Claims, 24 Drawing Sheets

FOREIGN PATENT DOCUMENTS

| | | |
|---|---|---|
| 2-227886 | 9/1990 | (JP) . |
| 5-28670 | 2/1993 | (JP) . |
| 5-47124 | 2/1993 | (JP) . |
| 5-47126 | 2/1993 | (JP) . |
| 6-259905 | 9/1994 | (JP) . |
| 6-309822 | 11/1994 | (JP) . |
| 8-180623 | 7/1996 | (JP) . |
| WO 93/02451 | 2/1993 | (WO) . |

\* cited by examiner

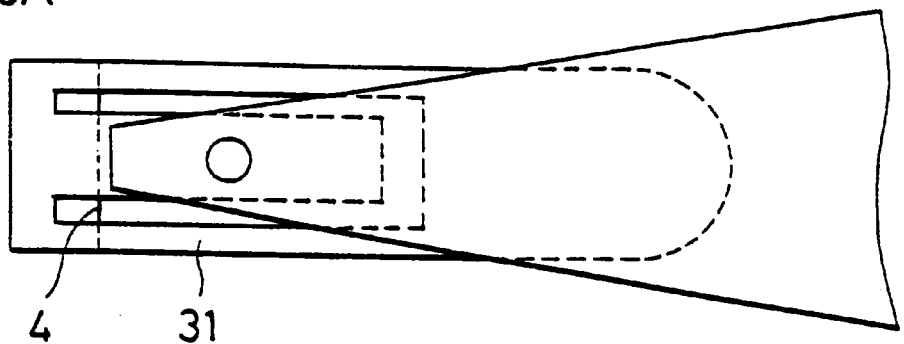
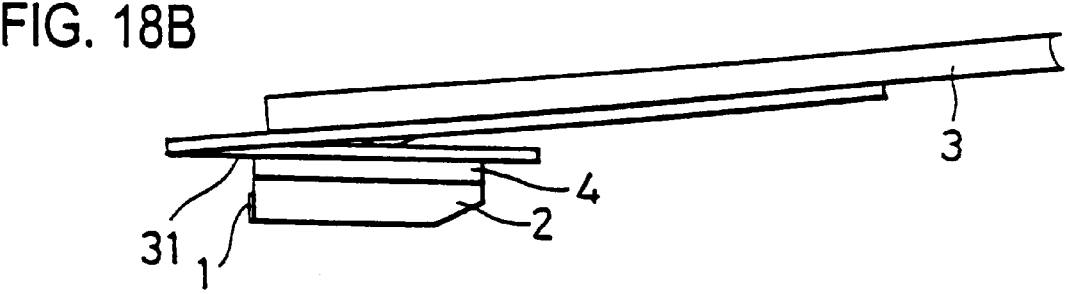
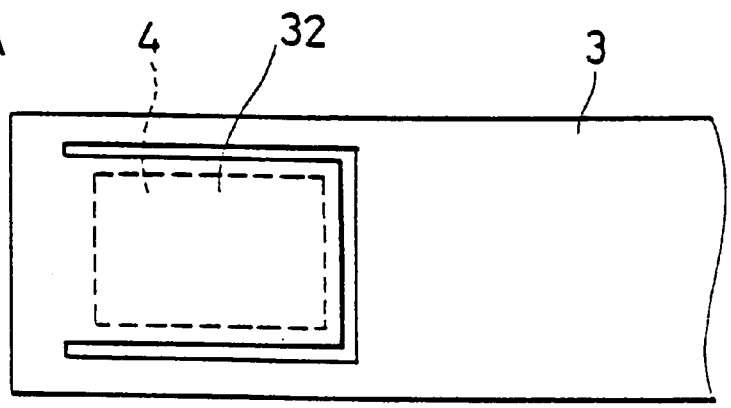
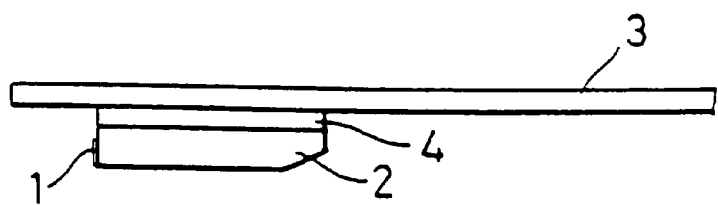

READ/WRITE HEAD INCLUDING DISPLACEMENT GENERATING MEANS THAT ELONGATES AND CONTRACTS BY INVERSE PIEZOELECTRIC EFFECT OF ELECTROSTRICTIVE EFFECT

FIELD OF THE INVENTION

The present invention relates to a read/write head, a read/write head positioning mechanism, and a read/write system such as a magnetic or optical disk drive.

DISCUSSION OF THE BACKGROUND

FIG. 32 is a plan schematic illustrative of a flying type magnetic head and a positioning mechanism therefor used in a conventional magnetic or hard disk drive (HDD).

As shown in FIG. 32, the magnetic head is built up of a slider 2 having an electromagnetic transducer element 1, and a suspension 3 for supporting the slider 2. For the purpose of simplification, interconnecting lines to make electric connections between the electromagnetic transducer element 1 and a signal processing circuit in the hard disk drive for the transmission of read/write signals are not illustrated.

A VCM (voice coil motor) 5 is used in an actuator for magnetic head positioning. The VCM 5 is built up of a coil 51, a permanent magnet 52, a bearing 53 and an arm 54. The arm 54 is provided with the coil 51 at one end and with the suspension 3 of the magnetic head at the other end. It is noted that, although not illustrated, another permanent magnet is provided on the coil 51.

The electromagnetic transducer element 1 comprises a magnetic pole and coil for converting electric signals to magnetic signals, and vice versa, and a magnetoresistance effect element for transforming magnetic signals into a voltage change, etc., each being fabricated by thin film techniques, assembly techniques, etc. The slider 2 is formed of non-magnetic ceramics such as $Al_2O_3$—TiC or $CaTiO_3$ or a magnetic material such as ferrite, and has a generally cuboidal shape. The surface (air bearing surface) of the slider 2 opposite to a disk medium 6 is processed into a shape suitable for generating pressure to fly the slider 2 on the disk medium 6 at a small spacing. The suspension 3 is formed by bending, punching or otherwise processing a resilient stainless sheet.

Then, an account is given of the recording, and reproducing operations of the magnetic head. The disk medium 6 rotates at high speed, e.g., several thousand rpm, and so an amount of air enters between the disk medium 6 and the slider 2 to apply flying force on the slider 2. On the other hand, the slider 2 is pressed by the suspension 3 toward the disk medium 6 under a given load, so that the slider 2 is filed on the disk medium 6 at a small spacing on the basis of a flying force vs. pressure relation.

The magnetic head is connected to the VCM 5, and so is movable in the radial direction of the disk medium 6 by its swing motion around the bearing 53, allowing positioning control of the electromagnetic transducer element 1, i.e., seek control for moving the element 1 onto any read/write track, and read/write track-following control.

For positioning control of the electromagnetic transducer element 1, the electromagnetic transducer element 1 first detects a track position signal recorded in the disk medium 6. Then, the signal is operated in a head positioning control circuit 7 so that a given current is passed through the coil 51 in the VCM 5 via an amplifier 8 to control force generated between the coil 51 and the permanent magnet 52. Upon positioned on the target track, the electromagnetic transducer element 1 writes and reads magnetic signals in and from the disk medium 6.

As mentioned above, it has so far been general to use a voice coil motor as magnetic head positioning means.

A problem with a magnetic disk drive is a track misregistration that is an offset between the magnetic head and the recording tracks caused by vibrations of the disk medium surface in synchronism or a synchronism with the rotation of the disk medium, eccentricity of the disk medium, thermal expansion and extraneous vibrations of the magnetic disk drive including the magnetic head and disk medium, etc. This track misregistration leads to problem, for instance, erasion upon recording of signal information stored in adjacent tracks due to overwriting, a drop upon reproduction of the level of signals outputted from the track concerned, and a quality drop of output signals due to the entrance of signals from adjacent tracks in the form of crosstalk noises.

For read/write purposes, it is thus required to allow the position of the electromagnetic transducer element in the magnetic head to follow a given recording track on the disk medium precisely and rapidly.

A grave problem attendant to the conventional magnetic disk drive is, however, that there is a limit in positioning precision, especially recording track-following precision due to the swing motion of the whole of a massive structure comprising the magnetic head, arm and coil, the movement of the slider via the resilient suspension, and the fact that the bearing providing the center of the swing motion has in itself friction resistance, eccentricity, and so on.

On the other hand, a magnetic disk drive is increasingly required to have ever-higher recording density, and so have ever-higher track density and ever-narrower track width and, with this, it is required to make magnetic head positioning precision ever-higher. So far, a positioning control bandwidth is up to about 500 Hz and positioning precision is about 0.3 $\mu$m. As the recording track width becomes as narrow as about 1 $\mu$m, however, it is required that the control bandwidth be extended to a few kHz and the positioning precision be on the order of about 0.1 $\mu$m or less. For these reasons, the problems associated with a conventional magnetic head positioning mechanism become even more troublesome.

The flying height of the magnetic head is generally within the range of about 50 nm to about 100 nm. As the read/write track pitch becomes as narrow as about 1 $\mu$m while such a flying height is maintained, however, several problems arise, for instance, erasion upon recording of signal information stored in adjacent tracks due to a recording magnetic field leakage, and an S/N degradation upon reproduction due to a drop of signal level absolute output. To maintain stable read/write characteristics, it is therefore required to reduce the flying height of the magnetic head with respect to the disk medium to 50 nm or lower. As the flying height decreases, however, it is required to more severely control the flying characteristics (fluctuations in the flying height) of the magnetic head upon seek control or read/write track-following control, and the smoothness of the disk medium.

In recent years a magnetic head called a pseudo-contact type magnetic head having a very small flying height or a contact type head that is always in contact with a disk medium, too, is under development. For these magnetic heads taking aim at achieving much higher recording densities, it is very difficult to conduct seek control or read/write track-following control.

For one approach to improving magnetic head positioning precision, it has been proposed to provide a magnetic head mounting arm or supporting spring (suspension) with a micro-displacement actuator such as a piezoelectric element (see JP-A's 5-28670 and 5-47216). With this approach some improvement may be introduced in the magnetic head positioning precision. However, this approach, too, is unavoidably affected by vibrations of the suspension because the slider is driven via the suspension having resiliency as in the case of the aforesaid VCM positioning mechanism. Thus there is a limit in positioning precision improvements.

For slider displacement, it has also been put forward to use an electrostatic force microactuator ("Magnetic Recording Head Positioning at Very High Track Densities Using a Microactuator-Based, Two-Stage Servo System", IEEE TRANSACTIONS ON INDUSTRIAL ELECTRONICS, Vol. 42, No. 3, pp. 222–233, June 1995) or an electromagnetic force microactuator ("Silicon Microstructures and Microactuators for Compact Computer Disk Drives", IEEE CONTROL SYSTEMS, pp. 52–57, December 1994). However, it is found that with the electrostatic force actuator it is difficult to generate driving force large enough to displace the slider, and with the electromagnetic force actuator there is concern that the magnetic signal on a disk medium is affected by flux leakage. A problem common to both actuators is that they are sensitive to extraneous disturbances because the slider must be held in place by means of a support member that has small resiliency and can be deformed by electrostatic force, and electromagnetic force generated from the actuators. Such a problem is also found in JP-A 8-180623 disclosing that a slider is driven by an electrostatic actuator.

Further, JP-A 6-259905 discloses an actuator for a read/write system, in which a slider comprising a read/write function part (an electromagnetic transducer element) is coupled to a suspension driven by a voice coil motor via a driving member such as a piezoelectric element. In the first embodiment (see FIG. 1) described therein, a thin type micro-motion mechanism part (a driving member) is built up of a set of opposite thin sheets and a set of piezoelectric elements. Both ends of each sheet are diagonally provided with flexures for connecting thereto either one of both ends of each piezoelectric element, and the terminals of the piezoelectric elements are connected to such flexures. With this type, of micro-motion mechanism part, both the piezoelectric elements are deformed in such a manner that they elongate or contract, thereby providing micro-displacement of the read/write function part in a direction substantially perpendicular to the elongation, and contraction direction of the piezoelectric elements. In the second embodiment (see FIG. 2) described in the publication, a thin type micro-motion mechanism part is again built up of a set of opposite thin sheets and a set of piezoelectric elements. However, this second embodiment is different from the first embodiment in that a flexure for connecting one end of each piezoelectric element is provided at one end of each thin sheet. At the thin type micro-motion mechanism part, each piezoelectric element is bendable within a plane parallel with the flying surface of the slider and in the same direction, thereby providing micro-displacement of the read/write function part, as in the first embodiment. In the third embodiment (see FIG. 3) described in the publication, a micro-motion mechanism part is built up of a set of bendable piezoelectric elements alone. In other words, each piezoelectric element is connected at one end with the slider and at the other end with the suspension.

JP-A 6-259905 refers to a micro-motion actuator with a piezoelectric element embedded in a slider itself as a prior art example, and notes that such a slider (a micro-motion actuator) has an adverse influence on its flying characteristics because its flying surface is twisted, distorted or otherwise deformed. In connection with the advantages of the invention, on the other hand, the publication notes that since no stress is applied at all on the slider at the aforesaid thin type micro-motion mechanism part and so no deformation of the slider occurs, it is possible to construct an actuator having no adverse influence at all on the flying behavior of the magnetic head. However, the first and second embodiments of the thin type micro-motion mechanism part described therein are each of an assembly structure wherein a set of thin sheets are connected together with a set of piezoelectric elements, assuming that there is no characteristic difference between both piezoelectric elements. Nonetheless, the magnetic head is susceptible to displacement in the flying direction (fluctuations in the flying height) due to assembly errors, etc. Assembly steps required for the assembly structure incur some considerable cost, and the assembly structure renders it difficult to increase its rigidity, resulting in a mechanical robustness drop problem associated with bonded parts. In addition, the assembly structure becomes poor in displacement characteristics due to the need of drawing interconnecting lines out of the electrodes of the piezoelectric elements, and costs much as well thanks to its complexity. The third embodiment, too, poses similar problems, for instance, variations in displacement characteristics due to assembly errors.

It is noted that the actuator shown in FIG. 6 of JP-A 6-259905 as an prior art example, and the actuator set forth in JP-A 5-28670 has a structure wherein displacement generating means such as piezoelectric elements are fitted into a suspension. For such a structure, it is difficult to place the size of the displacement generating means and the size of the spaces in which they are fitted under tolerance control. For piezoelectric elements having a very small displacement amount, it is undesirable that a gap exists between them because there is loss or a variation of the amount of displacement transmitted, or otherwise no displacement is transmitted to the actuator whatsoever. To eliminate such a gap, high-precision assembly techniques are need, but not only do they involve technical difficulties but incur some considerable expense as well.

JP-A 63-291271 discloses a magnetic head positioning arrangement including a micro-motion mechanism comprising a piezoelectric element or an electrostrictive element between a slider and a load bar. The micro-motion mechanism set forth in the example of the publication comprises a thin piezoelectric element sheet provided with a C-shaped cutout. By elongating or contracting a part of the piezoelectric element sheet, the slider can be linearly displaced in the same direction as the direction of elongation and contraction. This micro-motion mechanism is of an integrated structure rather than an assembly structure, wherein the amount of displacement of the slider depends on the amount of linear displacement of the piezoelectric element sheet. To increase the amount of displacement of the slider, therefore, there is no choice but to increase the size of the micro-motion mechanism.

In the arrangement illustrated in FIGS. 1 to 4 of JP-A 5-47126, a sheet form of piezoelectric element itself is bonded to a head supporting spring, and so the head supporting spring provides a load that hampers the displacement of the piezoelectric element. For this reason, there is a further decrease in the small amount of displacement of the piezoelectric element. In addition, no sufficient robustness is achievable because some load is applied on the piezoelectric element, resulting in a reduction of its life, and a premature degradation of its performance. When an adhesive layer usually comprising an organic resin, etc. is used for the bonding of the piezoelectric element, the following problems arise. Transmission loss occurs because the displacement of the piezoelectric element gives rise to deformation of the adhesive layer; bonding reliability drops because some load is applied on the adhesive layer upon the displacement of the piezoelectric element; and displacement transmitted from the piezoelectric element to the electromagnetic transducer element through the adhesive layer is susceptible to a secular change because the adhesive force (fixing force), and rigidity of the adhesive layer changes depending on the aforesaid load, and ambient conditions (high temperature, high humidity, and so on).

Illustrated in FIG. 6 of JP-A 6-309822 is a read/write head comprising driving means of the structure in which piezoelectric elements, each in a sheet form, are mounted on a pair of metal thin sheets forming parallel leaf springs of a gimbal member formed at a tip of a suspension. According to such driving means, upon the elongation and contraction of the piezoelectric elements there is a difference between their length and the length of the metal thin sheets, which in turn allows both the elements and the sheets to be so deflected that an electromagnetic transducer element can be displaced. In this arrangement, too, there is again a reliability drop because the piezoelectric elements deflect the metal thin sheets through an adhesive layer.

JP-A 60-47271 discloses a flying head having a driving element between a slider and a head body, said driving element providing micro-motion of the head body in a direction of intersecting the parallel information tracks. As this driving element a piezoelectric element is mentioned. Typically, the publication refers to a flying head making use of a thickness change of a multilayer piezoelectric element to provide micro-motion of the head body, and a flying head making use of a bimorph type piezoelectric element. The head body set forth in the publication is an ordinary bulk type magnetic head, rather than a thin film head type of electromagnetic transducer element. The multilayer piezoelectric element described in the publication utilizes displacement in the same direction as an electric field direction, i.e., piezoelectric longitudinal effect, which gives rise to a thickness-wise linear displacement to displace the head body linearly. A problem with this flying head is, therefore, that the size of the piezoelectric element must be increased to increase the amount of displacement of the head body. Another problem with this flying head is that a part of the flying surface is susceptible to deformation, and displacement as well. This leads to further problems that the flying characteristics are unstable, and the read/write characteristics are unstable as well due to fluctuations in the spacing between the head body and the medium.

While explanation has been made with reference to a magnetic head out of read/write heads, it is understood that the problems mentioned in connection with magnetic head positioning are all true of a recording/reproducing head for optical disk systems. A conventional optical disk system makes use of an optical pickup comprising an optical module including at least a lens. This optical pickup is so designed that the lens can be mechanically controlled so as to be focused on the recording surface of the optical disk. In recent years, near field recording has been proposed to achieve ever-higher optical disk recording densities. In this regard, see "NIKKEI ELECTRONICS", Jun. 16, 1997 (No. 691), page 99. This near field recording makes use of a flying head which uses a slider like a slider used with a flying type magnetic head. Built in this slider is an optical module comprising a hemispherical lens called a solid immersion lens or SIL, a magnetic field modulation recording coil, and a prefocusing lens. Another flying head for near field recording is disclosed in U.S. Pat. No. 5,497,359. An optical disk used in combination with such a flying head has very high recording track densities. Accordingly, when positioning is effected with respect to recording tracks, the same problems as mentioned with reference to the flying type magnetic head arise.

SUMMARY OF THE INVENTION

One object of the present invention is to achieve high-precision yet fast positioning of an electromagnetic transducer element or an optical module mounted in a read/write head in read/write systems such as magnetic or optical disk devices. Another object of the present invention is to achieve easy control of position fluctuations, upon such positioning, of the electromagnetic transducer element or optical element in a direction vertical to a recording medium surface.

Such objects are achievable by the inventions defined below as (1) to (17).

(1) A read/write head comprising a slider provided with an electromagnetic transducer element or an optical module, an actuator, and a suspension, wherein:

said slider is supported on said suspension via said actuator, said actuator comprises a fixed part, a movable part and at least two beam members for connecting said fixed and movable parts together, at least one of said two beam members having a displacement generating means that elongates and contracts by inverse piezoelectric effect or electrostrictive effect in a direction of connecting said fixed part and said movable part, and said fixed part being fixed to said suspension and said movable part being fixed to said slider, upon elongation and contraction of said displacement generating means, said displacement generating means deflects and said movable part displaces linearly, circularly or rotationally with respect to said fixed part in a plane defined by a sheet-like member, and said electromagnetic transducer element or said optical module displaces in a direction of intersecting recording tracks on a recording medium in a linear or circular orbit, and said fixed part, movable part and beam members are formed as an integrated single piece by providing a hole and/or a cutout in a sheet-like member constructed of a piezoelectric or electrostrictive material.

(2) The read/write head recited in (1), wherein said actuator is located on a back or side surface of said slider.

(3) The read/write head recited in (2), wherein said actuator is located in a space formed by a step provided on the back surface of said slider.

(4) The read/write head recited in any one of (1) to (3), wherein said slider and said actuator are opposed to each other with said suspension sandwiched therebetween.

(5) The read/write head recited in any one of (1) to (4), wherein a part of said suspension is provided with a gimbal member for allowing said slider to follow a surface of said recording medium, and said actuator is coupled to said gimbal member.

(6) The read/write head recited in any one of (1) to (5), wherein at least two piezoelectric or electrostrictive material layers, each having electrode layers on both sides, are provided at said displacement generating means in said actuator.

(7) The read/write head recited in any one of (1) to (6), wherein an amount of displacement of said electromagnetic transducer element or said optical module is larger than an amount of elongation and contraction of said displacement generating means in said actuator.

(8) The read/write head recited in (7), wherein the amount of displacement of said electromagnetic transducer element or said optical module is larger than an amount of displacement of a juncture between said slider and said actuator.

(9) The read/write head recited in (7) or (8), wherein the amount of displacement of said juncture between said slider and said actuator is larger than the amount of elongation and contraction of said displacement generating means in said actuator.

(10) The read/write head recited in any one of (1) to (9), wherein an interconnection line with respect to said actuator and/or said electromagnetic transducer element or said optical module is formed at said suspension.

(11) A read/write head positioning mechanism comprising a read/write head as recited in any one of (1) to (10), and a main actuator for driving the whole of said read/write head.

(12) A mechanism for performing positioning of a read/write head comprising a slider provided with an electromagnetic transducer element or an optical module, an actuator, and a suspension, wherein:

said slider is supported on said suspension via said actuator, said actuator comprises a fixed part, a movable part and at least two beam members for coupling said fixed part and said movable part together, said at least two beam members each having a displacement generating means that elongates and contracts by inverse piezoelectric effect or electrostrictive effect in a direction of connecting said fixed part and said movable part, and said fixed part being fixed to said suspension and said movable part being fixed to said slider, upon elongation and contraction of said displacement generating means, said displacement generating means deflect and said movable part displaces linearly, circularly or rotationally with respect to said fixed part, whereby said electromagnetic transducer element or said optical module displaces in a linear or circular orbit and said electromagnetic transducer element or said optical module displaces in a direction of intersecting recording tracks on a recording medium in a linear or circular orbit, and upon positioning of a direction of said electromagnetic transducer element or said optical module that displaces in a direction of intersecting said recording tracks, the total sum of driving voltages applied on said displacement generating means is controlled to keep said total sum constant at any time.

(13) The read/write head positioning mechanism recited in (12), wherein:

a direction of elongation and contraction of each displacement generating means is invariable with respect to an applied voltage having the same polarity, and a voltage applied on each displacement generating means is a voltage having a control voltage added to a direct current bias voltage, and the total sum of said control voltages added to said displacement generating means is controlled in such a manner that said total sum is constantly zero at any time.

(14) The read/write head positioning mechanism recited in (12) or (13), wherein:

each of said displacement generating means comprises a displacement part that elongates and contracts by an applied voltage and a pair of coverings between which said displacement part is sandwiched, said displacement part and said coverings being stacked in a direction vertical to a surface of a recording medium, and said coverings are in close contact with said displacement part, and are deformed upon elongation and contraction of said displacement part.

(15) The read/write head positioning mechanism recited in any one of (12) to (14), wherein said read/write head is a read/write head as recited in any one of (1) to (10).

(16) The read/write head positioning mechanism recited in any one of (12) to (15), which further comprises a main actuator for driving the whole of said read/write head.

(17) A read/write system comprising a read/write head as recited in any one of (1) to (10) or a read/write head positioning mechanism as recited in any one of (11) to (16).

BRIEF DESCRIPTION OF THE DRAWINGS

FIG. 18A is a side schematic illustrative of one embodiment of the invention wherein the slider is coupled to a gimbal part of the suspension in the magnetic head according to the present invention, and FIG. 18B is a side schematic of that embodiment.

FIG. 19A is a side schematic illustrative of another embodiment of the invention wherein the slider is coupled to a gimbal part of the suspension in the magnetic head according to the present invention, and FIG. 19B is a side schematic of that embodiment.

DISCUSSION OF THE PREFERRED EMBODIMENTS

Features and advantages of the read/write head according to the present invention will now be explained specifically with reference to a magnetic head.

Figure 1:
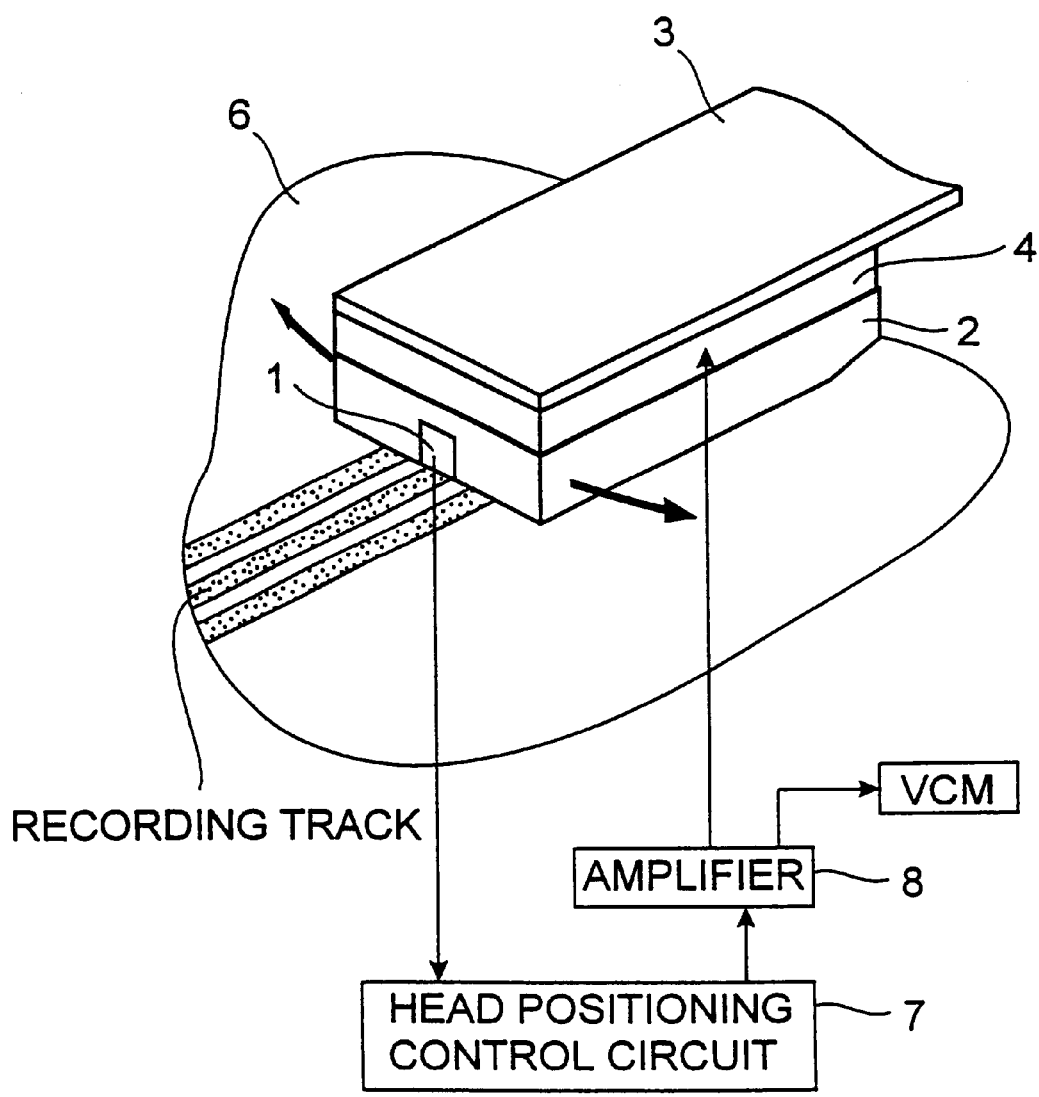
FIG. 1 is a perspective schematic illustrative of one typical basic construction of the magnetic head according to the present invention, and the positioning mechanism for an electromagnetic transducer element.

One exemplary structure of the magnetic head according to the present invention is illustrated in FIG. 1. An actuator 4 is located between a slider 2 having an electromagnetic transducer element 1 and a suspension 3 to make connections between them. The actuator 4 is provided with at least one piezoelectric or electrostrictive material layer having electrode layers on both sides. In the present invention, this layer acts as a displacement generating means. The displacement generating means generates elongation and contraction motions by inverse piezoelectric effect or electrostrictive effect. The elongation and contraction motions in turn cause the displacement of the slider 2 relative to the suspension 3. At this time, the slider 2 is coupled to the actuator 4 in such a direction that the direction of displacement of the electromagnetic transducer element 1 crosses recording tracks, preferably in a direction substantially intersecting the recording tracks at right angles. At the actuator 4 the elongation and contraction of the displacement generating means is controlled by voltage control based on track misregistration signals, so that the electromagnetic transducer element 1 can follow the recording tracks.

In such an arrangement, the precision of slider positioning by the elongation and contraction of the displacement generating means in the actuator can be 0.1 µm or less. In addition, slider positioning control frequencies can be increased to a few kHz or higher for the reasons that the mass of the slider to be driven by the actuator is much smaller than that of the whole of the magnetic head including an arm, a coil and a suspension that form a conventional positioning mechanism (VCM), the slider is regarded as a rigid body because of being free of spring nature, the driving force the actuator can generate through inverse piezoelectric effect or electrostrictive effect is sufficiently larger than that generated by an electrostatic force actuator having the same amount of displacement, and so on. It is thus possible to increase positioning precision to much higher levels, as compared with a conventional magnetic disk system in which positioning is carried out by use of VCM alone. It is also most unlikely that the disk medium may be adversely affected by a flux leakage which may occur in the case of an electromagnetic force actuator. For an actuator making use of electrostatic force or electromagnetic force, it is required that a movable part be supported by a resilient member having a relatively low rigidity, and so misregistration is likely to occur due to vibrations or shocks. In the present invention, however, such misregistration is unlikely to occur because it is possible to use piezoelectric or electrostrictive ceramics having high rigidity, and the actuator can be coupled to the slider with no resilient member located between them.

With the magnetic head of the present invention, it is thus possible to make positioning control frequency bandwidth wider and hence achieve higher-precision track positioning control, as compared with one conventional positioning method wherein the whole of a magnetic head including a springy suspension is displaced by VCM or a micro-displacement actuator such as a piezoelectric element, and another conventional positioning method wherein a slider is displaced by an actuator using electrostatic force or electromagnetic force.

In the actuator used herein, the (fixed and movable) parts connected to the slider and suspension and the beam members having displacement generating means are formed as an integrated single piece by providing a hole and/or a cutout in a sheet member formed of a piezoelectric or electrostrictive material. It is thus possible to increase the rigidity and dimensional accuracy of the actuator with no concern about assembly errors. There is also no problem regarding transmission loss due to an adhesive layer, a secular change of adhesion strength and so on, because no adhesive is used for the fabrication of the actuator itself and hence any adhesive layer does not exist at parts producing stresses due to the deformation of the displacement generating means. In addition, since the respective parts are formed as an integrated single piece, internal electrode layers $A_1$, $B_1$ and $G_1$ formed on the displacement generating means may be extended to a fixed part 43 for connection to terminal electrodes $A_0$, $B_0$ and $G_0$ thereof, as depicted typically in FIGS. 25A and 25B. In this arrangement, it is unnecessary to connect wires or other interconnections to the electrodes of the displacement generating means for the purpose of driving the actuator. Furthermore, it is possible to achieve interconnections to the slider via the actuator, rather than via wires, etc. Consequently, actuator fabrication can be easily achieved with high reliability. However, the actuator (thin type micro-motion mechanism part) set forth in JP-A 6-259905 is poor in rigidity, robustness, and dimensional accuracy because members corresponding to fixed and movable parts and members corresponding to displacement generating means have been first independently fabricated, and then assembled into a single piece. Further, such an actuator is susceptible to fluctuations in the flying direction thanks to unavoidable assembly errors. Further-more, some problems arise regarding fabrication cost, and reliability because wire interconnections to the members corresponding to the displacement generating means are generally needed.

Fundamentally, the magnetic head of the present invention can be achieved simply by adding the actuator described herein to a conventional magnetic head, and so conventional parts or members for electromagnetic transducer element, slider and suspension can be immediately used with no considerable cost increase.

Figure 22A:
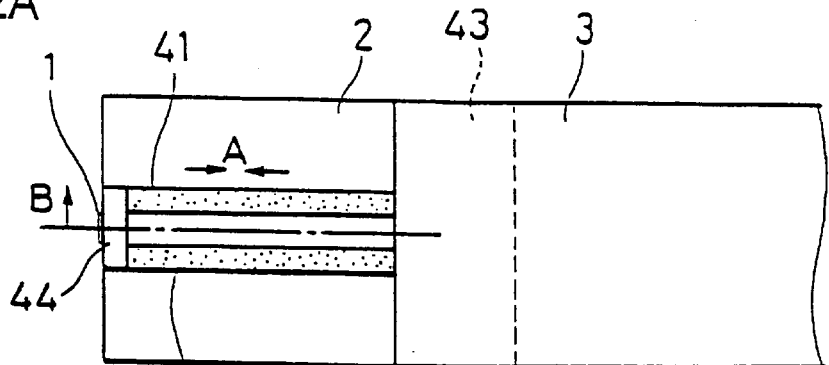
FIG. 22A is a plan view illustrative of one embodiment of the invention wherein, in the magnetic head according to the present invention, the amount of displacement of the electromagnetic transducer element can be larger than the amount of elongation and contraction of displacement generating means in the actuator.
Figure 23A:
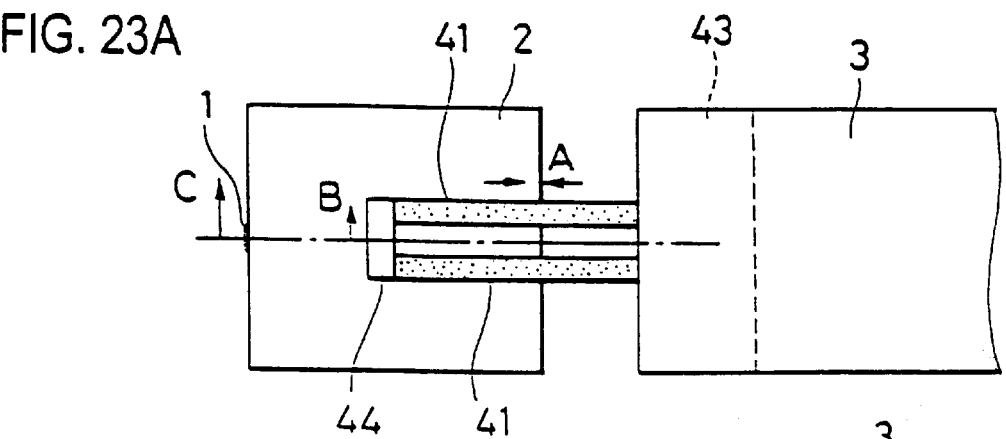
FIG. 23A is a plan view illustrative of one embodiment of the invention wherein, in the magnetic head according to the present invention, the amount of displacement of the electromagnetic transducer element can be larger than the amount of elongation and contraction of displacement generating means in the actuator.

The amount of displacement generated by inverse piezoelectric effect or electrostrictive effect is very small but, according to the present invention, it is possible to make the amount of displacement of the electromagnetic transducer element larger than the amount of elongation and contraction of the displacement generating means or the amount of displacement of the movable part. In short, it is possible to amplify the amount of displacement. In one exemplary embodiment of the actuator, the displacement generating means is designed to deflect upon its elongation and contraction. In an actuator as shown typically in FIG. 22A, it is possible to make the amount of displacement of a movable part 44 (a juncture between the slider and the actuator) larger than the amount of elongation and contraction of a displacement generating means 41. Thus, the actuator shown in FIG. 22A is an embodiment of the present invention wherein the actuator itself has the function of amplifying displacement. When the displacement of the movable part generated with respect to the fixed part upon the elongation and contraction of the displacement generating means is a circular or rotational displacement, it is possible to make the amount of displacement of the electromagnetic transducer element larger than that of the movable part by making suitable modifications to actuator structure or the position of connection between the actuator and the slider. In an actuator as shown typically in FIG. 22A, the movable part displaces circularly. If, in this case, the juncture between the movable part 44 and the slider 2 is located away from the electromagnetic transducer element 1 at an increased distance as depicted in FIG. 23A, it is then possible to make the amount of displacement of the electromagnetic transducer element 1 larger than that of the movable part 44. According to the present invention wherein the amount of displacement can be amplified, it is thus possible to obtain a practically enough amount of displacement even when the actuator is miniaturized. In an arrangement wherein the elongation and contraction of a piezoelectric element are used to provide linear displacement in the same direction as the direction of elongation and contraction, however, it is inevitably required to increase the size of the actuator so as to obtain a practically sufficient amount of displacement.

If, in the present invention, the displacement generating means in the actuator has a so-called multilayer structure wherein there exist at least two piezoelectric or electrostrictive material layers, each having electrode layers on both sides, it is then possible to make each piezoelectric or electrostrictive material layer thin and hence increase electric field intensity upon the application of a given driving voltage thereon. It is in turn possible to increase the amount of displacement, or to reduce the driving voltage required for the generation of a given amount of displacement.

Advantages and features of specific embodiments of the present invention will now be explained.

If, in the present invention, the actuator 4 is located on the back surface of the slider 2 as depicted typically in FIGS. 2 to 5, the back surface of the slider 2 is then available for interconnections.

Figure 11:
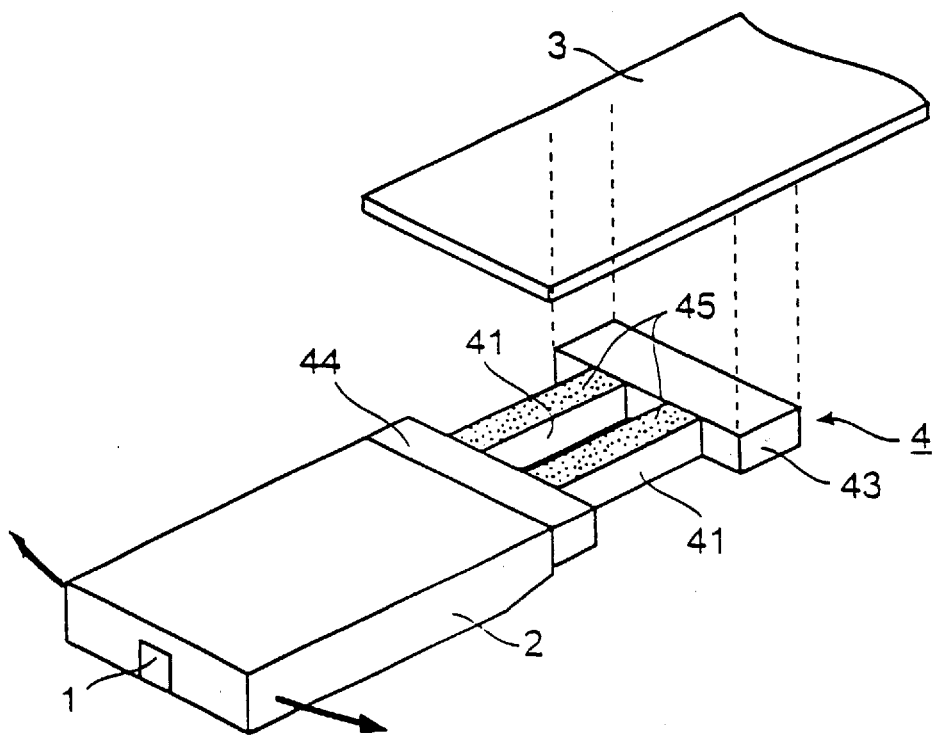
FIG. 11 is a perspective schematic illustrative of one actuator embodiment wherein the actuator is located on the side of the slider in the magnetic head according to the present invention.
Figure 12:
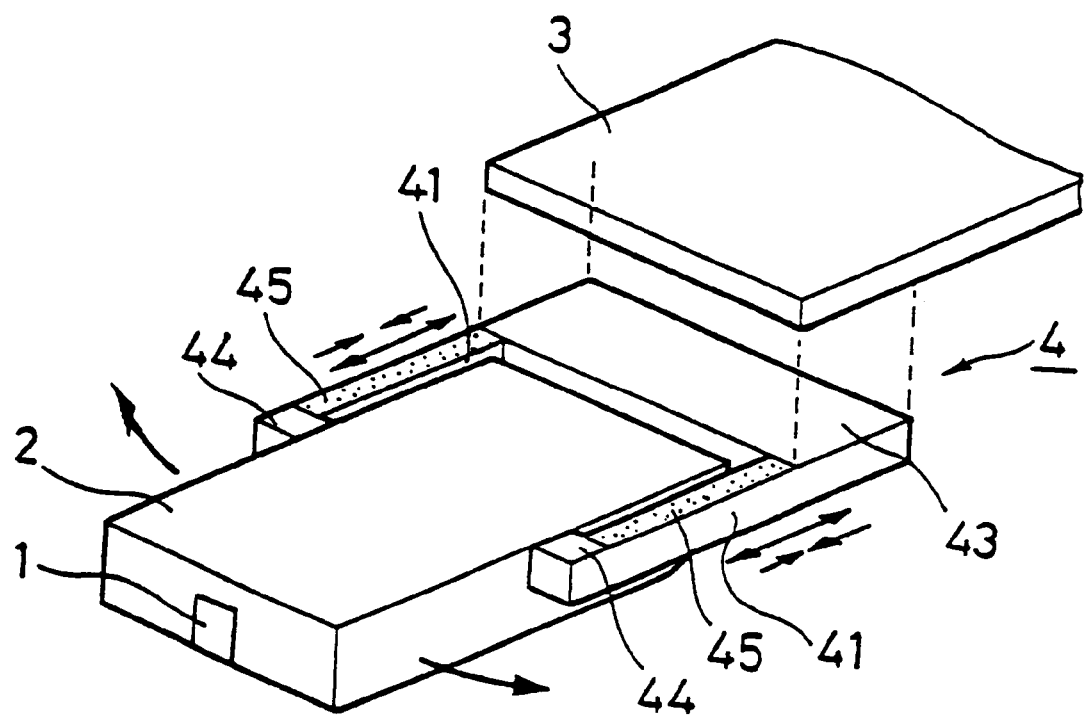
FIG. 12 is a perspective schematic illustrative of another actuator embodiment wherein the actuator is located on the side of the slider in the magnetic head according to the present invention.
Figure 13:
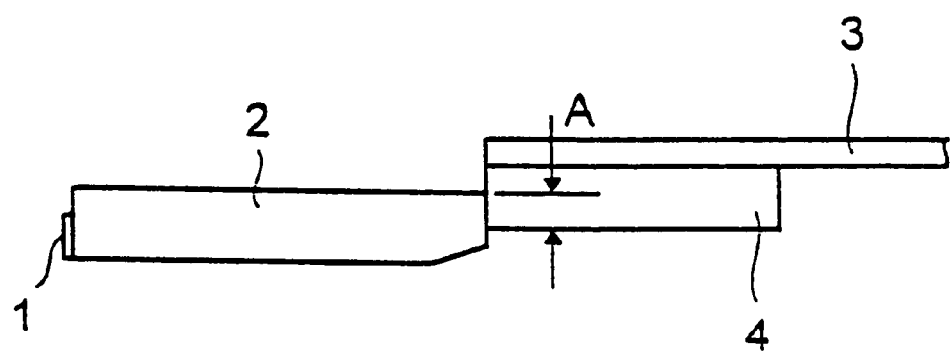
FIG. 13 is a perspective schematic illustrative of a further actuator embodiment wherein the actuator is located on the side of the slider in the magnetic head according to the present invention.

If, in the present invention, the actuator 4 is located on a side of the slider 2 as depicted typically in FIGS. 11 to 13, it is then possible to minimize an increase in the overall thickness of the magnetic head which may otherwise be caused by the provision of the actuator 4. When, in this case, the actuator 4 is thinner than the slider 2, it is then possible to eliminate any increase in the thickness of the magnetic head. An ordinary magnetic disk system usually comprises a plurality of disk media superposed one upon another with a magnetic head operating space sandwiched between them. To make the magnetic disk system thin, it is required to reduce a spacing between adjacent disk media. Therefore, if the actuator 4 is located on the side of the slider 2 as shown, the thickness increase of the magnetic head can then be so reduced that it is easily achieved to make the magnetic disk system thin.

Figure 14:
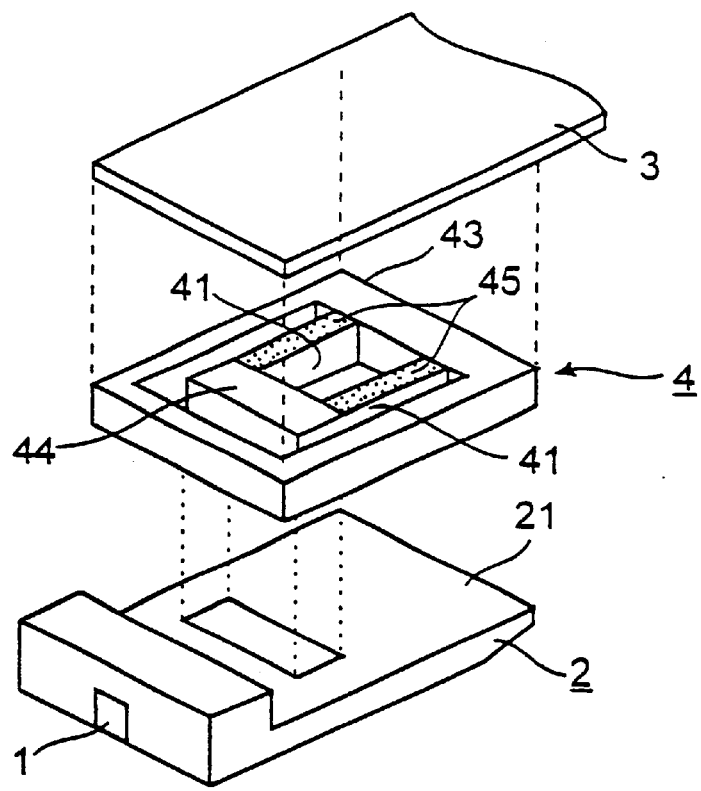
FIG. 14 is a perspective schematic illustrative of one actuator embodiment wherein the actuator is located in a space formed by a step provided on the back surface of the slider in the magnetic head according to the present invention.
Figure 15:
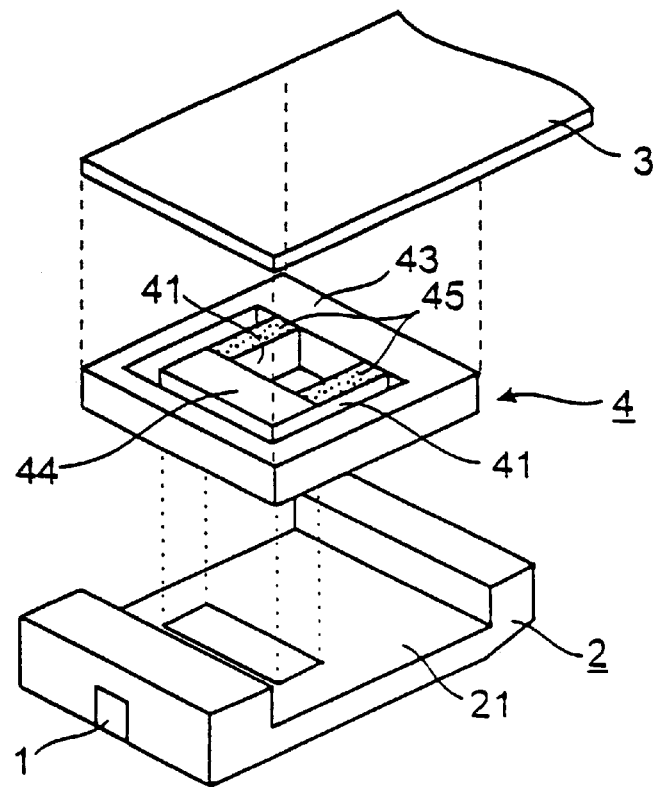
FIG. 15 is a perspective schematic illustrative of another embodiment wherein the actuator is located in a space formed by a step provided on the back surface of the slider in the magnetic head according to the present invention.

Even though, as shown in FIGS. 14 and 15 for instance, the actuator 4 is located in a space 21 defined by at least one step formed on the back surface of the slider 2, it is then possible to reduce an increase in the thickness of the magnetic head. In this case, it is additionally possible to provide an extension of control bandwidth because of a decrease in the mass of the slider 2 to be driven.

Figure 16:
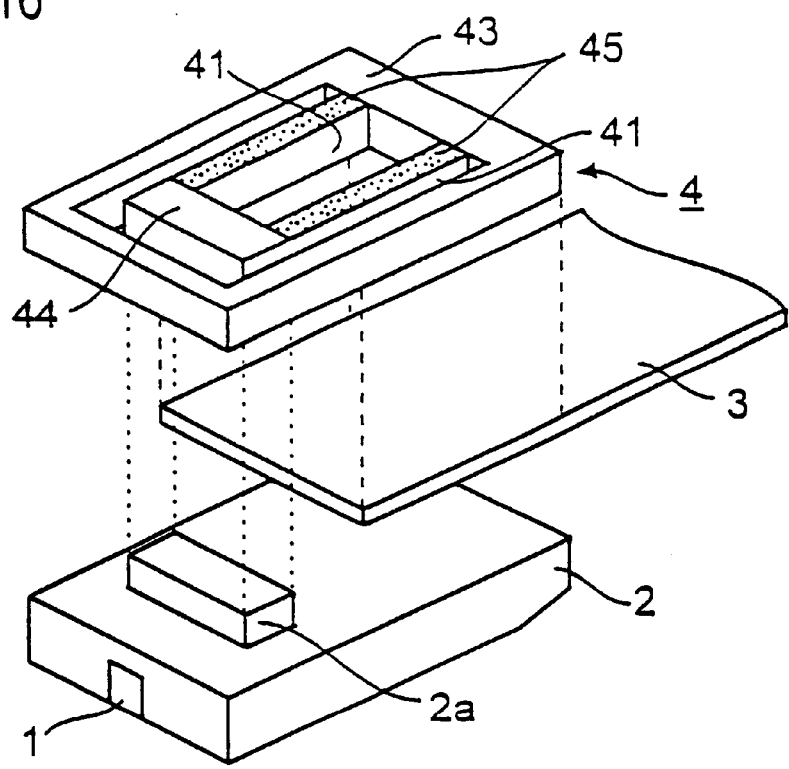
FIG. 16 is a perspective schematic illustrative of one actuator embodiment wherein the slider and actuator are opposed to each other with the suspension sandwiched between them.
Figure 17:
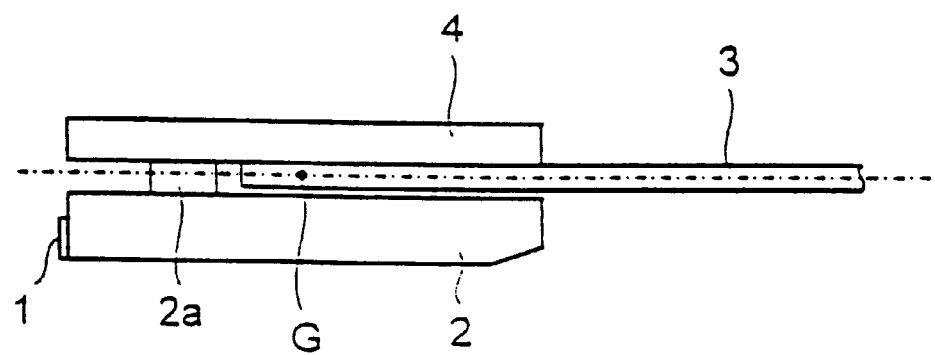
FIG. 17 is a side schematic illustrative of one actuator embodiment wherein, in the magnetic head according to the present invention, the actuator is coupled to the suspension in the vicinity of the center of gravity of a structure comprising the slider and actuator.

If the slider 2 is opposed to the actuator 4 with the suspension 3 sandwiched between them as shown typically in FIGS. 16 and 17, it is then possible to substantially eliminate such a structural imbalance as found in a conventional magnetic head, said imbalance resulting from the fact that there is a slider on one side of a suspension but is nothing on the other side. For this reason, the distortion, etc. of the suspension is reduced upon the swing motion of the overall magnetic head by means of VCM or the like, so that the slider can be in a stabilized position. Especially if the mass of a structure comprising slider 2 and actuator 4 is distributed at substantially 1:1 between above and below the suspension 3, that is, if the suspension 3 or a line extending therefrom is designed to pass through the vicinity of the center of gravity of that structure, the aforesaid structural imbalance can be overcome to much higher levels.

As shown typically in FIGS. 18A, 19A, 20A and 21, the suspension 3 may be provided with a gimbal (return spring) member or part that allows the slider 2 to follow a deflection of the surface of the disk medium. If, in this case, the actuator 4 is coupled to the gimbal member, the actuator 4 and slider 2 can then follow the disk medium as an integrated single piece, so that the gimbal mechanism can function effectively. In addition, any force resulting from the distortion, etc. of the gimbal member upon track following is not applied on the actuator, and so any lowering of actuator performance is prevented with improved reliability.

When the present invention is applied to a conventional magnetic disk system, it is usually preferable to use a VCM or the like that is a positioning control mechanism in the conventional magnetic disk system as a main actuator, and use the actuator mounted on the magnetic head according to the present invention as a secondary actuator. In other words, it is general that the VCM plays a main roll in seek motion and the actuator coupled to the slider plays a main roll in track following motion. Consequently, satisfactory positioning precision can be obtained. An electrostatic or electromagnetic force actuator, for which a slider must be supported by a resilient member, is susceptible to track misregistration due to residual vibrations after seek motion, and extraneous shocks and vibrations. According to the present invention, however, such track misregistration is unlikely to occur because the actuator is coupled to the slider not via any resilient member, and the actuator is overall constructed of a piezoelectric or electrostrictive ceramic material having high rigidity.

With the magnetic head of the present invention as described above, and a system set up by combining this magnetic head with a conventional positioning device such as VCM, it is possible to achieve high-precision yet fast positioning and, hence, to make recording track widths on disk media narrow and increase track densities thereon. This in turn makes it possible to increase recording densities on disk media and storage capacities of magnetic disk systems. Furthermore, it is possible to achieve a magnetic disk system with a much shorter access time.

Figure 32:
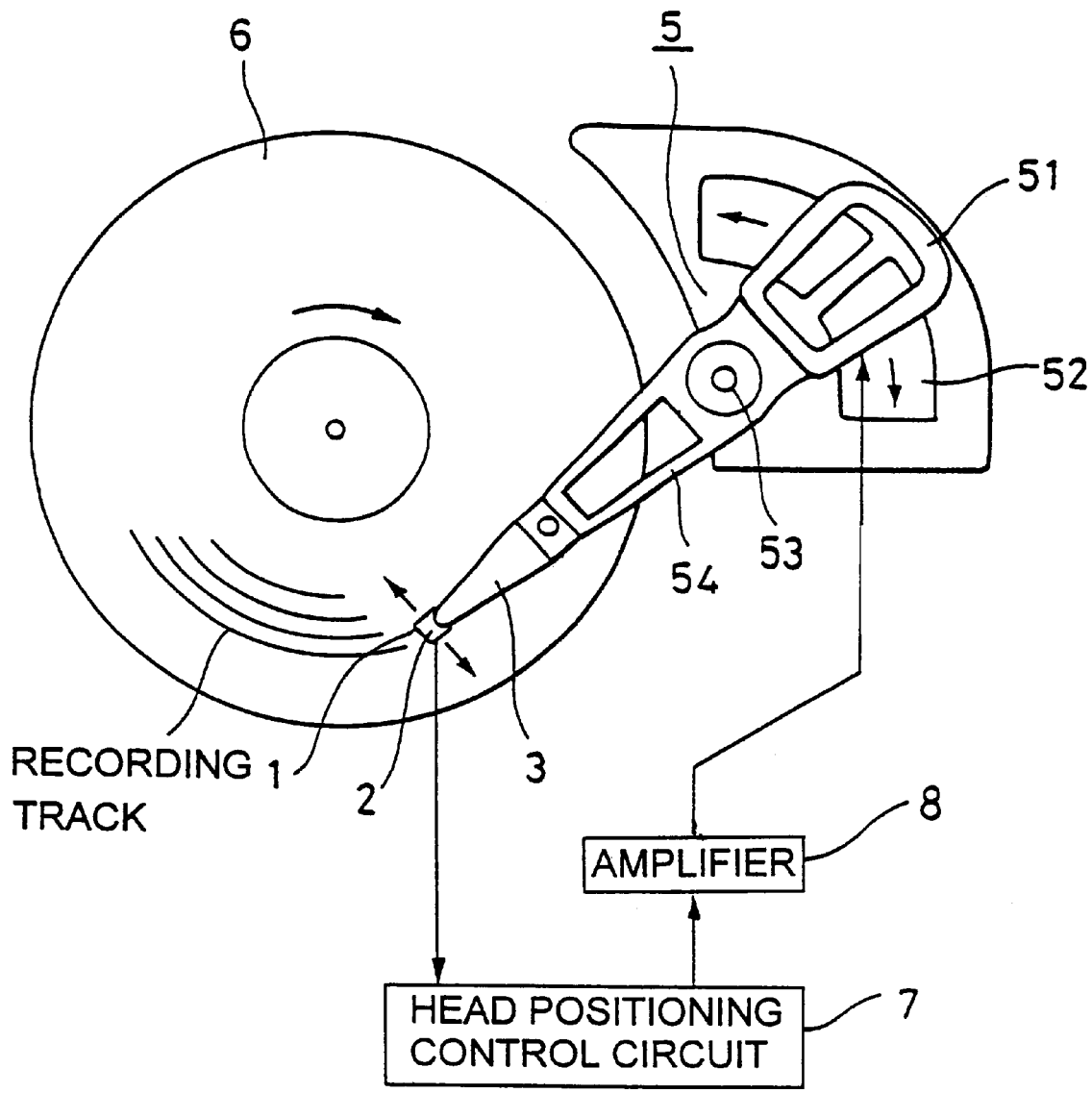
FIG. 32 is a plan view illustrative of one typical construction of a magnetic head positioning mechanism in a conventional magnetic disk drive.

In some specific embodiments of the present invention wherein the slider provided with the electromagnetic transducer element is displaced in a circular or rotational orbit, it is noted that it is possible to control the skew angle of the slider. As can be seen from FIG. 32, there is a difference in the angle of the slider's center line with the the slider's traveling direction (the extending direction of recording tracks) between the inner peripheral side and the outer peripheral side of the disk medium 6. This in turn causes the air-bearing surface of the slider to generate varying states of pressure, resulting in fluctuations in the flying characteristic of the slider. Fluctuations in the angle of the slider, if any, give rise to fluctuations in the angle of the electromagnetic transducer element with the recording tracks as well as in the read/write track widths. However, if the slider is displaced by the actuator in a circular or rotational orbit thereby reducing the change in the angle of the slider with the recording tracks, preferably keeping that angle constant, it is then possible to reduce flying characteristic fluctuations and read/write track width fluctuations.

It is noted that the present invention is applicable not only to a magnetic head in every magnetic disk system but also to a magnetic head in magnetic read/write systems making no use of a coarse-motion actuator such as VCM, for instance, a fixed or rotating head type magnetic tape read/write system, and other read/write systems using magnetic recording media.

A preferable method used for driving the magnetic head including an actuator will now be explained.

Referring to FIG. 1, positioning control of the electromagnetic transducer element 1 is performed as follows. First, the electromagnetic transducer element 1 detects track position signals recorded on the disk medium 6. Then, the head positioning control circuit 7 and amplifier 8 generate coarse-motion driving current and micro-motion driving voltage from the track position signals. Following this, the coarse-motion driving current is applied on VCM and the micro-motion driving voltage is applied on the displacement generating means in the actuator 4 for positioning control of the electromagnetic transducer element 1.

The actuator used herein is substantially free from assembly errors because the fixed and movable parts and displacement generating means are formed as an integrated single piece. However, the displacement generating means, for instance, may vary in shape and material, or may otherwise be asymmetric in a direction vertical to the direction of elongation and contraction thereof. In this case, the electromagnetic transducer element 1 displaces toward or away from the disk medium 6 when the displacement generating means in the actuator 4 are placed under elongation and contraction control based on the track position signals, resulting in fluctuations in the flying height of the electromagnetic transducer element 1 with respect to the disk medium 6. Such fluctuations take the form of a level change of output signals, which makes the error rate of read information worse. In addition, when the magnitude of fluctuations is large, there arises a grave head crash problem due to contact of the magnetic head with the disk medium.

To prevent the displacement of the displacement generating means in an unintended or unexpected direction, the shape symmetry, homogeneousness and other factors of the displacement generating means must be severely controlled. However, such severe control incurs a mass-productivity drop, and some considerable expense as well.

With the magnetic head positioning mechanism according to the present invention, fluctuations in the flying height due to the asymmetric shape, unhomogeneousness, and other defects of the displacement generating means in the flying direction can be reduced by control of driving voltage applied on the actuator. More specifically, the applied voltage is operated and controlled in the positioning control circuit 7 upon elongation and contraction control of the displacement generating means, so that the total sum of voltages applied on the displacement generating means is kept constant at any time. By doing this it is possible to reduce fluctuations in the flying height upon driving of the actuator. Thus, even when asymmetry and unhomogeneousness are found in the displacement generating means, the level change of output signals and the possibility of a head crash due to contact of the magnetic head with the disk medium can be reduced or substantially eliminated so that stable yet high-precision track positioning control is feasible. It is thus possible to preset the flying height at a low level and hence reduce the read/write track widths on the disk medium. It is in turn possible to increase track densities and hence recording densities on the disk medium.

The aforesaid method of controlling the driving voltage applied on the actuator is also effective for the aforesaid pseudo-contact type or contact type head. To provide a constant contact pressure, load is applied on these heads in such a direction that they are directed toward the surfaces of media. A factor in fluctuations in the flying height of a flying type head is tantamount to a factor in changes in the aforesaid contact pressure in the pseudo-contact type or contact type head. The contact pressure change in these heads brings about a frictional force change having an adverse influence on seek control, and track following control. An incremental contact pressure change causes fatal defects such as medium's surface failure and its concomitant dusting, and electromagnetic transducer element failure. However, if the aforesaid driving voltage control method is applied to the pseudo-contact type or contact type head, reliability improvements are then achievable because the contact pressure fluctuations can be reduced or substantially eliminated.

It is noted that such a positioning mechanism capable of controlling displacements in the flying direction can also be applied to a thin type micro-motion mechanism part of an assembly structure as set forth in JP-A 6-259905 for instance. It is then possible to control unintended or unexpected displacements in the flying direction, which may otherwise be caused by assembly errors.

While the present invention has been described with reference to its application to a magnetic head, it is understood that the present invention may be applied, with similar advantages and features, to a read/write head used in read/write systems made up of optical recording media such as optical disks. A read/write head (optical head) for optical recording media, to which the present invention may be applied, comprises a slider similar to a slider used with the aforesaid magnetic head, and an optical module built in the slider. Alternatively, the slider itself may be made up of an optical module. The optical module comprises at least a lens and, if required, a built-in lens actuator or magnetic field generating coil. Such an optical head, for instance, may be a flying type head used for the aforesaid near field recording, specifically one disclosed in U.S. Pat. No. 5,497,359. Besides, the present invention may be applied to an optical head with a slider slidable on the surface of a recording medium, i.e., a pseudo-contact type or contact type optical head. Advantages and features of the present invention obtained when it is applied to the optical head will be readily understood by regarding the electromagnetic transducer element referred to in the foregoing explanation as being an optical module.

Conceptually, the term "read/write head" used herein shall include a read/write head, a write-only head, and a read-only head. Likewise, the term "read/write system" used herein shall include a read/write system, a write-only system, and a read-only system. The term "recording medium" used herein, too, shall include a read-only type medium such as a read-only optical disk in addition to a recordable medium.

Preferred embodiments of the present invention will now be explained more specifically with reference to magnetic head embodiments shown in the accompanying drawings; however, it is here understood that the present invention may be applicable to an optical head.

FIG. 1 is a perspective schematic illustrative of the basic construction, and operation of the magnetic head according to the present invention. The magnetic head shown in FIG. 1 comprises a slider 2 provided with an electromagnetic transducer element 1, a suspension 3 for supporting the slider 2, and an actuator 4 located between the slider 2 and the suspension 3. The actuator 4 has a structure in which displacement generating means, and fixed and movable parts are formed as an integrated single piece. The displacement generating means are each provided with at least one piezoelectric or electrostrictive material layer having electrode layers on both sides, and are constructed in such a manner that they elongate and contract upon the application of voltage on the electrode layers. The piezoelectric or electrostrictive material layer is formed of a piezoelectric or electrostrictive material that elongates and contracts by inverse piezoelectric effect or electrostrictive effect. One end of the displacement generating means is coupled to the slider 2 via the movable part, and the other end of the displacement generating means is coupled to the suspension 3 via the fixed part. Upon the elongation and contraction of the displacement generating means, the slider 2 is displaced to displace the electromagnetic transducer element 1 linearly or circularly, so that the electromagnetic transducer element 1 can move across recording tracks on a disk medium 6.

Figure 2:
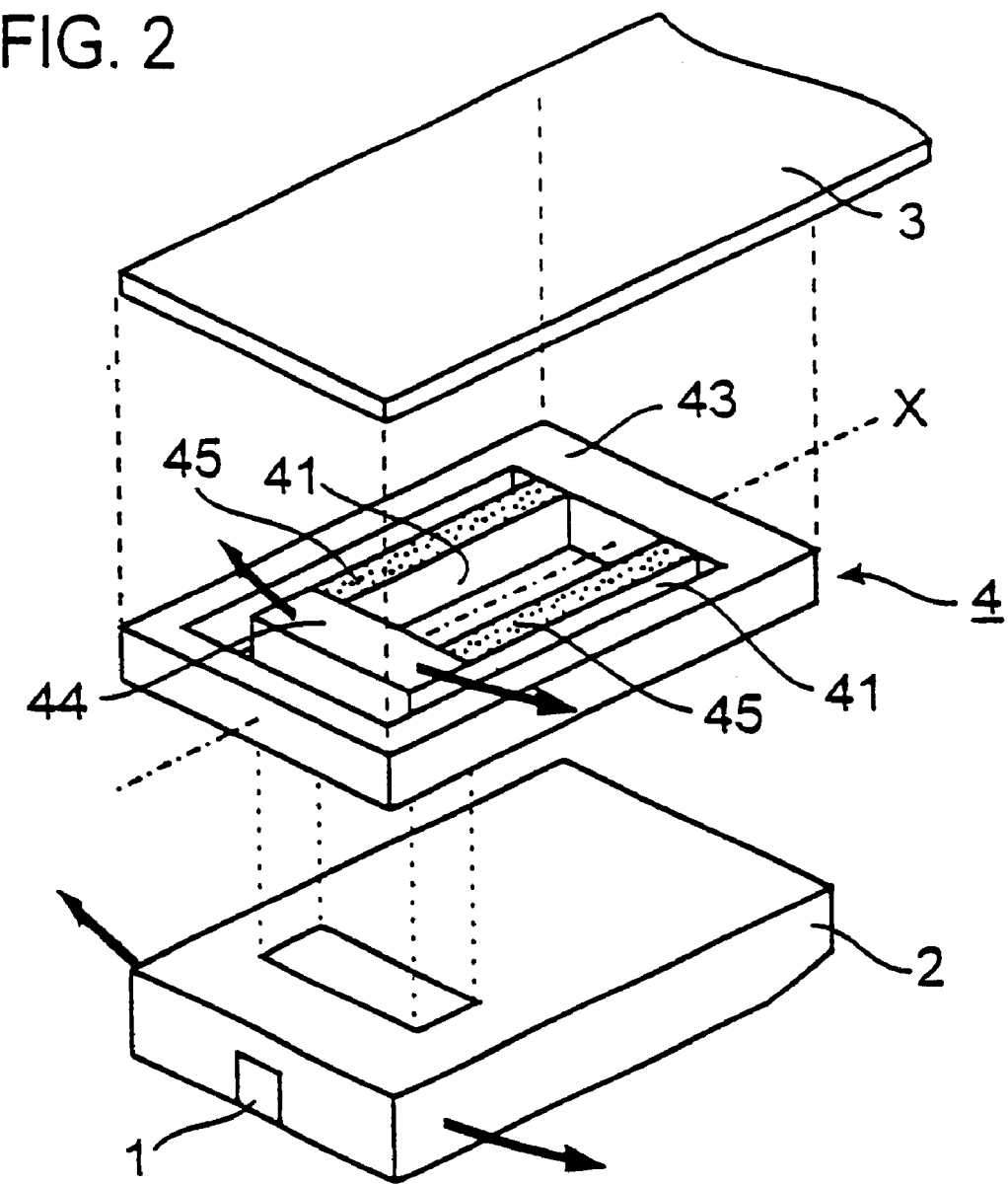
FIG. 2 is a perspective schematic illustrative of one actuator embodiment wherein the actuator is located on the back surface of the slider in the magnetic head according to the present invention.

Embodiment of the Invention Wherein the Actuator is Located on the Back Surface of the Slider FIG. 2 is an exploded perspective schematic illustrative of one exemplary construction of the magnetic head according to the present invention. The actuator depicted in FIG. 2 is provided with fixed and movable parts 43 and 44. Two rod-like beam members for making connections between the parts 43 and 44 are located in parallel with each other, and are each provided with an electrode layer 45 to form displacement generating means 41. The fixed part 43 is in a frame form in which the displacement generating means 41 and movable part 44 are enclosed. The movable and fixed parts 44 and 43 are coupled to the slider 2 and suspension 3, respectively, as by bonding.

The actuator depicted in FIG. 2 has a general structure in which two holes are formed in a sheet-like member that is formed of a piezoelectric or electrostrictive material and has electrode layers 45 at given positions to form the displacement generating means 41, fixed part 43, and movable part 44. This structure also holds for actuators which will be explained with reference to FIGS. 2 to 5.

In FIG. 2, the electrode layers 45 are shown, just as they are present on the surface of the displacement generating means 41, to provide a clear illustration thereof. Usually, however, the electrode layers are not exposed on the surface of the actuator. In other words, on the surface of each electrode layer there is a piezoelectric or electrostrictive material layer acting as a covering. This also holds for embodiments of the invention which will be explained with reference to other drawings.

When the piezoelectric or electrostrictive material layer sandwiched between a pair of electrode layers 45 in the displacement generating means 41 is constructed of a so-called piezoelectric material such as PZT, the piezoelectric or electrostrictive material layer is usually subjected to a polarizing treatment so as to improve its ability to displace. The direction of polarization by this polarization treatment is a thickness-wise direction of the sheet-like member. When the direction of an electric field upon the application of voltage on the electrode layers is in alignment with the direction of polarization, the piezoelectric or electrostrictive material layer between both electrode layers elongates in its thickness-wise direction (piezoelectric longitudinal effect), and contracts in its plane direction (piezoelectric transverse effect). When the direction of the electric field is reverse to the direction of polarization, on the other hand, the piezoelectric or electrostrictive material layer contracts in its thickness-wise direction (piezoelectric longitudinal effect), and elongates in its plane direction (piezoelectric transverse effect). In the illustrated embodiment, the piezoelectric transverse effect, i.e., the elongation and contraction of the piezoelectric or electrostrictive material layer in a direction of connecting the fixed and movable parts 43 and 44 is used to displace the movable part 44 circularly in a direction indicated by arrows in FIG. 2. This displacement in turn effects the swing motion of the slider 2, so that the electromagnetic transducer element 1 can be circularly displaced across the recording tracks.

When, in the illustrated embodiment, contraction-inducing voltage is applied alternately on one displacement generating means and another displacement generating means, the length ratio between one displacement generating means and another displacement generating means changes so that both displacement generating means deflect in the plane of the aforesaid sheet-like member, i.e., in the plane of the actuator in its plane direction. By this deflection, the movable part 44 swings with respect to the fixed part 43 in a direction indicated by arrows in FIG. 2, with the center of the swing motion defined by the position of the movable part 44 in the absence of voltage. This swing motion allows the movable part 44 to displace circularly in a direction substantially perpendicular to the direction of elongation and contraction of the displacement generating means 41. In this case, the center of the circular orbit is found in the vicinity of the center between two positions where both beam members are connected to the fixed part 43. Since the direction of the swing motion of the movable part 44 lies within the plane of the actuator, the electromagnetic transducer element 1, too, swings in a circular orbit. At this time, there is no fear of attenuation of polarization because the direction of voltage is in alignment with that of polarization. It is noted that even when the displacement generating means are elongated by voltage applied alternately on both displacement generating means, similar swing motion occurs.

In this embodiment, voltages may be simultaneously applied on both displacement generating means in such a manner that their displacements are reverse to each other. In other words, alternating voltages may be simultaneously applied on both displacement generating means in such a manner that one elongates while another contracts, and vice versa. At this time, the center of the swing motion of the movable part 44 is defined by the position of the movable part 44 in the absence of voltage. Assuming here that the same driving voltage is used, the amplitude of the swing motion is about twice as large as that in the case of the alternate application of voltage. On one side of the swing motion in this case, however, the displacement generating means is so elongated that the direction of the driving voltage is reverse to the direction of polarization. For this reason, the polarization of the piezoelectric or electrostrictive material layer may possibly attenuate at a high applied voltage or upon the continued application of voltage. It is thus required that the driving voltage be obtained by applying a constant direct current bias voltage in the same direction as that of polarization and superposing the aforesaid alternating voltage on the bias voltage, thereby foreclosing the possibility that the direction of driving voltage may be reverse to the direction of polarization. The center of the swing motion in this case is defined by the position of the displacement generating means with the bias voltage alone applied thereon.

In a modification of the embodiment shown in FIG. 2, it is possible to provide one beam member alone with the displacement generating means. In this modification, it is acceptable to increase the amount of displacement by not only the contraction but also the elongation of the displacement generating means, or to prevent the attenuation of polarization by the application of bias voltage, as is the case with the embodiment shown in FIG. 2.

Figure 3:
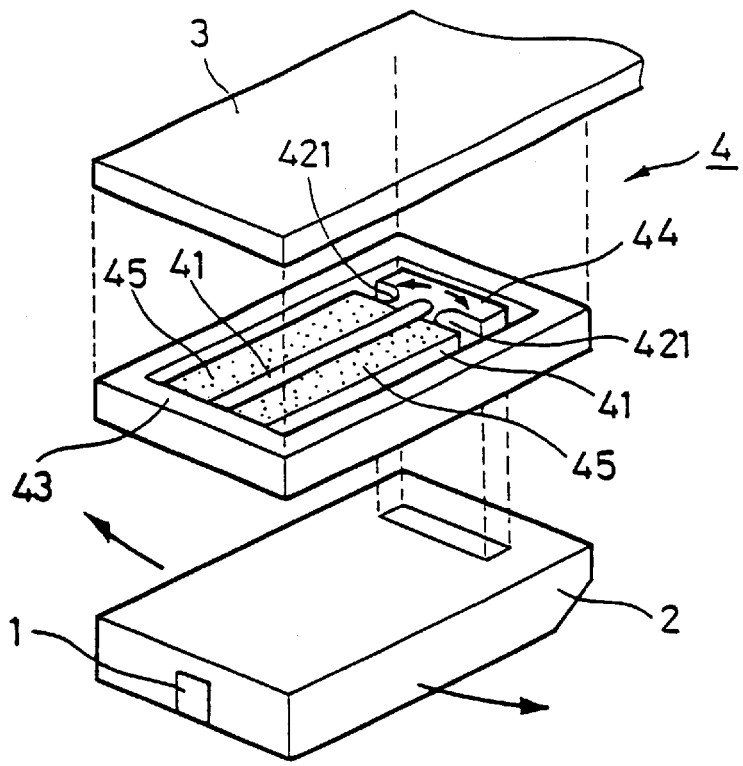
FIG. 3 is a perspective schematic illustrative of another actuator embodiment wherein the actuator is located on the back surface of the slider in the magnetic head according to the present invention.

An actuator embodiment shown in FIG. 3 is similar to that shown in FIG. 2 in that a frame form of fixed part 43 and a movable part 44 are connected to each other by means of two rod-like beam members and each beam member is provided with a pair of electrode layers 45 to constitute displacement generating means 41. The polarization of piezoelectric or electrostrictive material, too, is similar to that in the embodiment shown in FIG. 2. Only one difference is the provision of a hinge part 421 that is an area located between the displacement generating means 41 and the movable part 44. The hinge part 421 is smaller than the displacement generating means 41 in terms of width relative to thickness, and is lower than the displacement generating means 41 in terms of rigidity in the plane direction of the actuator.

When, in this embodiment, voltage is applied on both displacement generating means in such a manner that they displace in opposite directions, the hinge part 421, because of having a relatively low rigidity, deflects in the plane direction of the actuator upon the elongation and contraction of both displacement generating means. The amount of deflection of both displacement generating means, on the other hand, is small because of their relatively high rigidity.

Consequently, the movable part 44 effects a rotational displacement, the center of which lies in the vicinity of the center between two junctures with both beam members, so that an electromagnetic transducer element 1 can displace in a circular orbit.

In this embodiment, the lower the rigidity of the hinge part relative to that of the displacement generating means 41, the smaller is the amount of deflection of the displacement generating means 41. Consequently, the angle of rotation of the movable part 44 becomes large per unit amount of contraction of the displacement generating means 41.

Like the embodiment shown in FIG. 2, this embodiment, too, allows alternate application of voltage on both displacement generating means in such a manner that one elongates while another contracts, and vice versa. It may be acceptable to provide one beam member alone with electrode layers. In this case, however, it is noted that the center of rotation of the movable part 43 is found in the vicinity of a hinge part of another beam member having no electrode layers.

Figure 4:
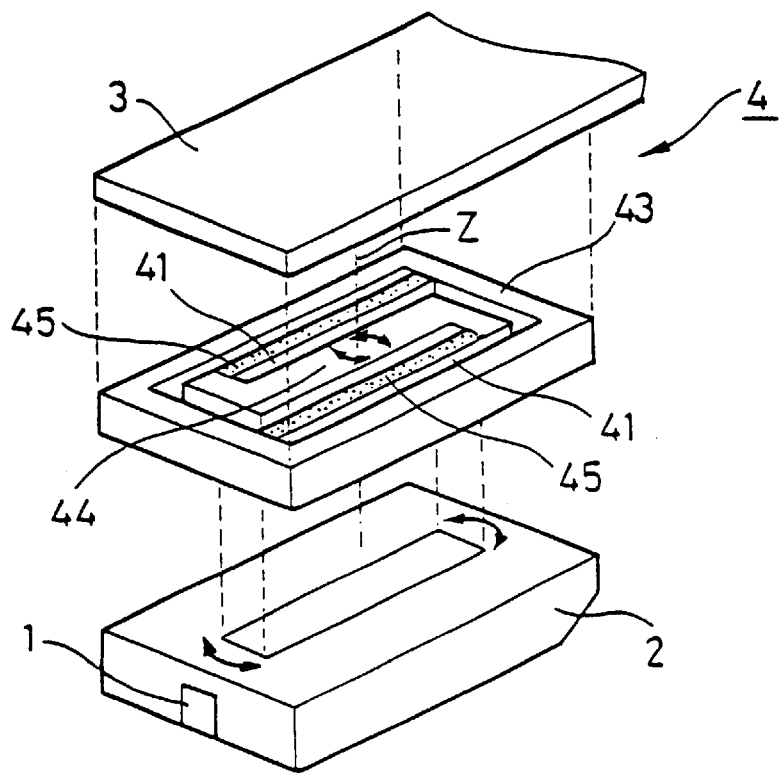
FIG. 4 is a perspective schematic illustrative of a further actuator embodiment wherein the actuator is located on the back surface of the slider in the magnetic head according to the present invention.
Figure 5:
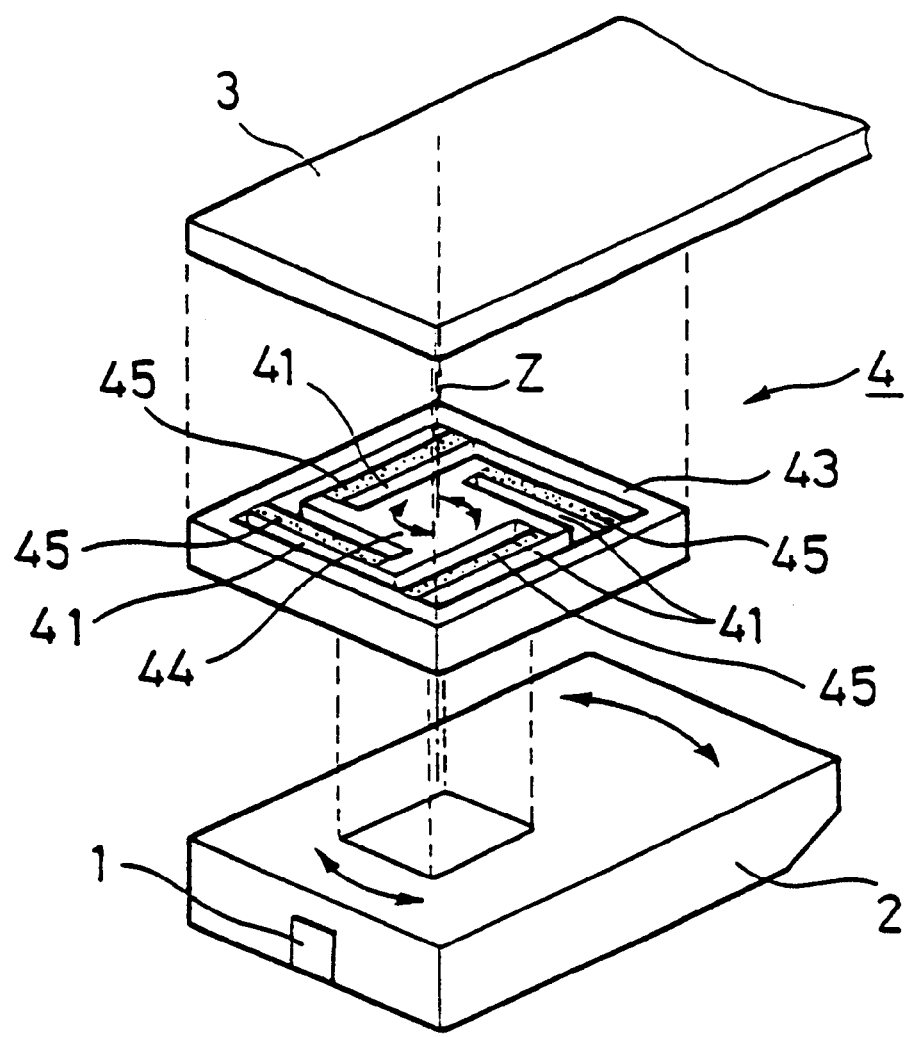
FIG. 5 is a perspective schematic illustrative of a still further actuator embodiment wherein the actuator is located on the back surface of the slider in the magnetic head according to the present invention.

FIGS. 4 and 5 illustrate further actuator embodiments, each comprising a frame form of fixed part 43 providing an outer frame of the actuator, a movable part 44 enclosed in the fixed part 43, and a plurality of L-shaped beam members for connecting both parts together. In the embodiment shown in FIG. 4 two beam members are used, while in the embodiment shown in FIG. 5 four beam members are used. The outer configuration of each actuator rotationally symmetric with respect to an axis of symmetry (Z-axis shown) which is vertical to the plane of each actuator and passing through the center of the movable part 44.

When, in each embodiment, voltage is applied on both displacement generating means in such a manner that they contract concurrently or elongate at the same time, the movable part 44 effects rotational motion around the aforesaid axis of symmetry, so that an electromagnetic transducer element 1 can displace in a circular orbit. These actuator embodiments are less likely to have an adverse influence on the vibration characteristics of the magnetic head because the slider is rotationally driven and so reaction to driving is limited. Even with the embodiment shown in FIG. 3, similar advantages and features are achievable because it is possible to drive the slider rotationally. It is here noted that by the wording "rotational driving of the slider" is intended the rotation of the slider around an axis passing therethrough.

In each of such actuator embodiments, it is noted that an area located between the displacement generating means 41 and the movable part 44 may be designed in such a shape that its rigidity lying in the plane direction of the actuator becomes lower than that of the displacement generating means 41. This area then acts in much the same manner as the hinge part 421 in FIG. 3.

With each of these actuator embodiments wherein the beam members are located parallel with the longitudinal direction of a slit-like hole between the fixed part 43 and the movable part 44 or, in another parlance, in such a manner that they traverse the slit-like hole longitudinally, it is possible to make the displacement generating means 41 long and hence make the angle of rotation of the movable part 44 large. If required, however, the beam members may be designed to cross the slit-like hole transversely.

To allow the movable part to effect rotational motion, the number of beam members is not necessarily two or four; that is, it may be three or five or more. The outer or inner configurations of the frame form of fixed part and the movable part, too, are not limited to a rectangular shape; that is, they may be either in other polygonal shape or in round shape.

In FIG. 5, there are two sets of pairs of beam members symmetric with respect to the aforesaid axis of symmetry. Only one set of beam members may be provided with electrode layers. In this case, another set of beam members may act as a support or hinge part.

In FIG. 4, too, only one beam member may be provided with electrode layers. Alternatively, only one beam member may be provided with electrode layers and another beam member may be located in such a manner that it crosses the aforesaid slit-form hole transversely, thereby forming a hinge part. In these embodiments, however, the center axis of rotational motion is located off the center of the movable part.

Figure 6:
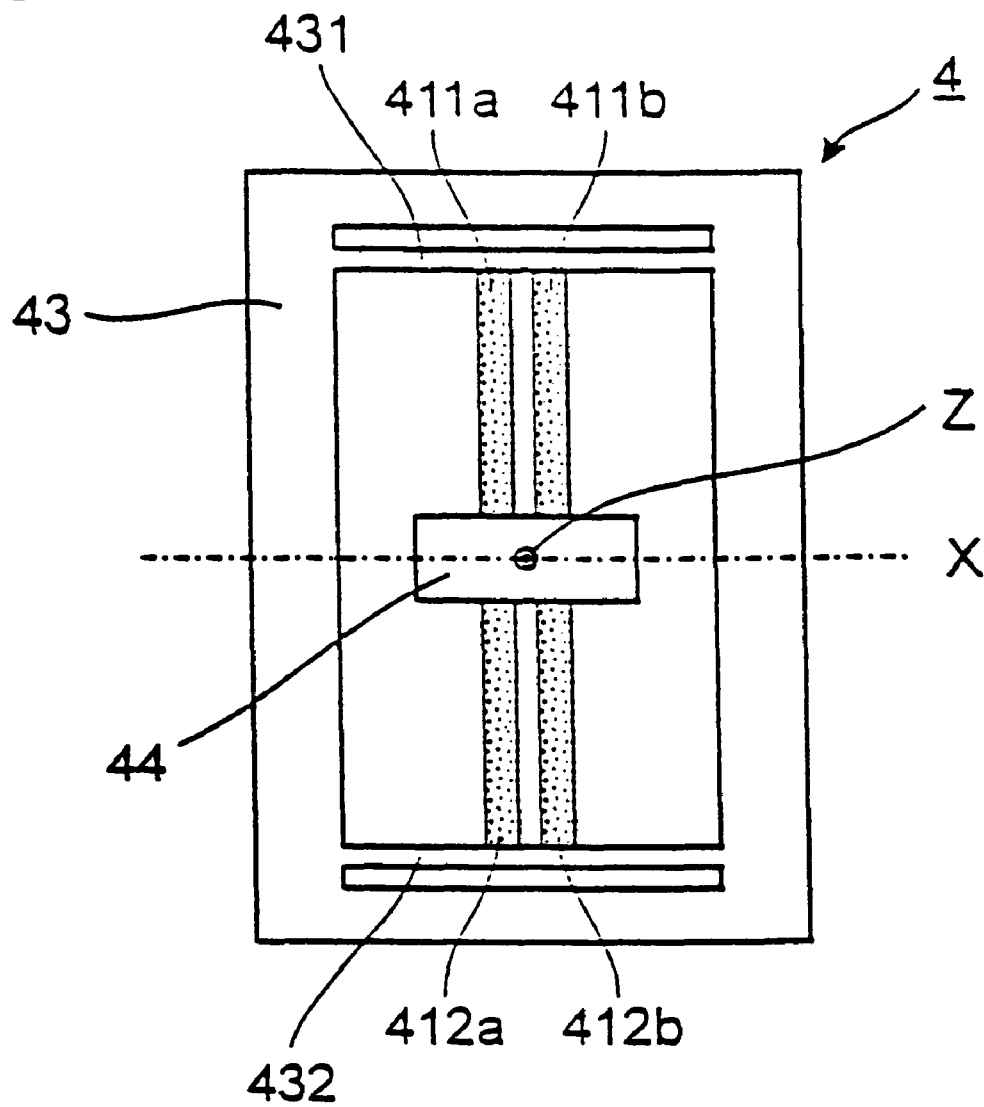
FIG. 6 is a plan schematic illustrative of one embodiment of the actuator in the magnetic head according to the present invention.

In an actuator embodiment shown in FIG. 6, upon the elongation and contraction of displacement generating means they deflect and a movable part displaces linearly or rotationally with respect to a fixed part in a plane of said sheet-like member.

More specifically, an actuator 4 shown in FIG. 6 comprises a frame form of fixed part 43 in which enclosed are a movable part 44, and two pairs of displacement generating means, each pair consisting of two parallel displacement generating means, that is, a first pair (of displacement generating means 411a and 411b) and a second pair (of displacement generating means 412a and 412b). Each pair of displacement generating means elongate and contract in parallel directions.

In a plane of this actuator, an X-axis is defined by an axis that passes through the movable part 44 and is vertical to the direction of elongation and contraction of the displacement generating means. The first and second pairs of displacement generating means are specularly symmetric with respect to each other, with the X-axis located between them.

Each displacement generating means is coupled to fixed connectors 431 and 432 mounted on the fixed part 43. These fixed connectors are formed by providing slit-like holes through a portion of the frame form of fixed part 43, and are areas that are of narrow width, and low rigidity in the plane direction. The reason for coupling the displacement generating means to the fixed connector of low rigidity is to permit its elongation and contraction to occur in an undisturbed manner. The means for decreasing the rigidity of the fixed connectors is not particularly limited. The rigidity decrease may be achieved by not only a structure as depicted in FIG. 6 but also making a portion of the fixed part 43 thin as in the case of fixed connectors 431 to 434 shown in FIG. 10 for instance. Since the fixed connectors must be deformed upon the actuator driven, they are not bonded to the suspension when the fixed part of the actuator is bonded thereto. This is also true of an actuator that will be explained with reference to FIG. 10.

Figure 7A:
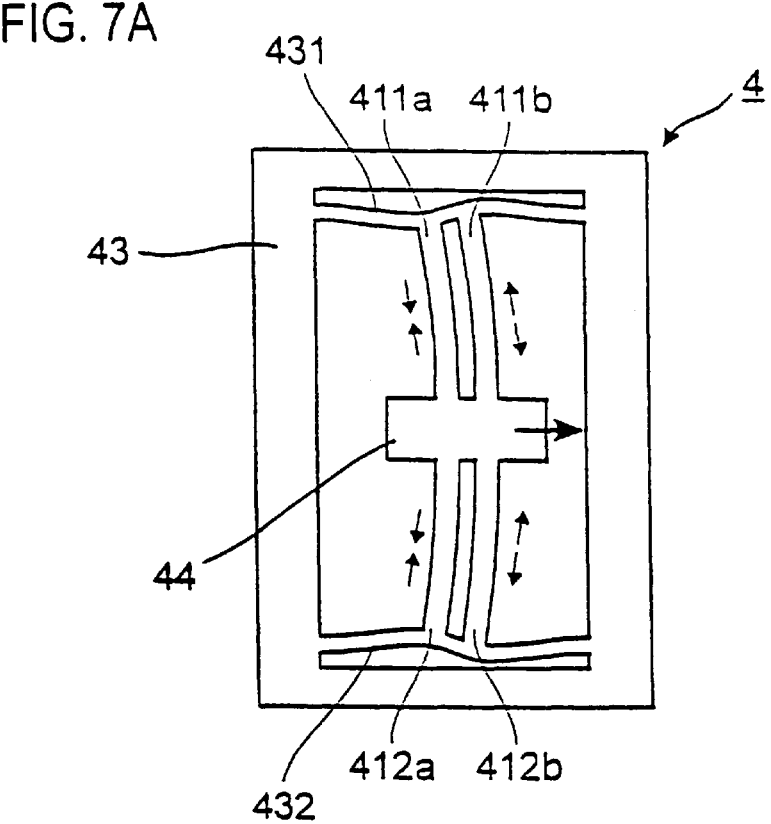
FIG. 7A is a plan schematic that illustrates exaggeratively the deflection of each part upon the linear displacement of a movable part in the actuator shown in FIG. 6.
Figure 7B:
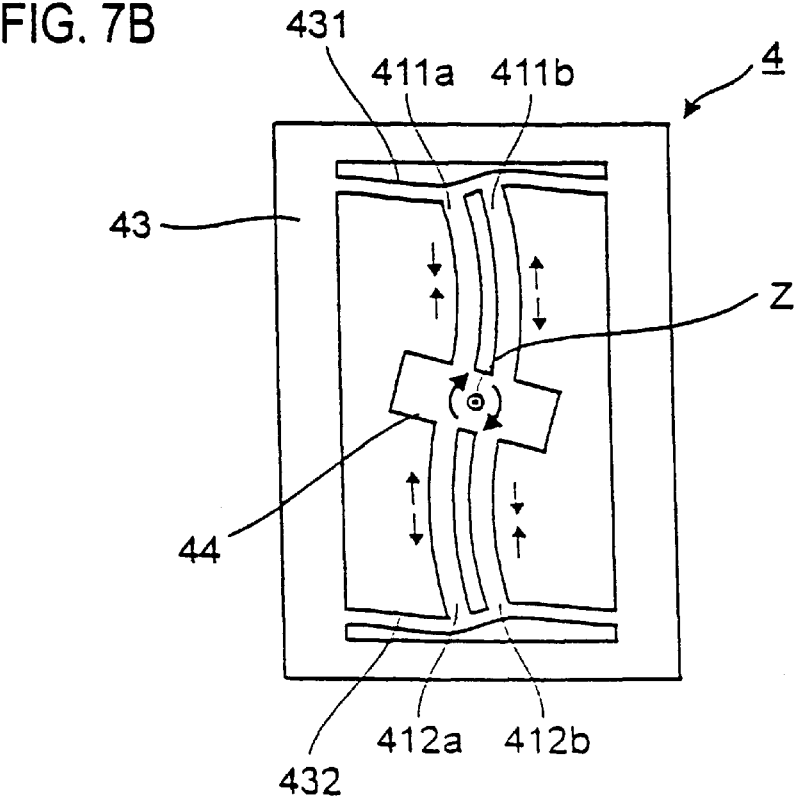
FIG. 7B is a plan schematic that illustrates exaggeratively the deflection of each part upon the rotational displacement of a movable part in the actuator shown in FIG. 6.

FIGS. 7A and 7B are plan schematics showing exaggeratively the deformation of each part when the actuator is driven. The operation of the actuator will be explained below with reference to these figures.

Now assume that, at the startup of the actuator, the displacement generating means 411a and 412a located on one side (the left side of FIG. 7) of the respective pairs are contracted and the displacement generating means 411b and 412b located on the other side (the right side of FIG. 7) are elongated. Then, as shown in FIG. 7A, the fixed connectors 431 and 432 deflect so that each displacement generating means elongates and contracts in an undisturbed manner. Consequently, all the displacement generating means deflect in such a manner that they become convex on the right side, and so the movable part displaces linearly in the right-handed direction.

Assume here that the displacement generating means 411a on the left side of the first pair and the displacement generating means 412b on the right side of the second pair are contracted while other displacement generating means 411b and 412a are elongated. Then, as shown in FIG. 7B, the fixed connectors 431 and 432 deflect so that each displacement generating means elongates and contracts in an undisturbed manner. Consequently, the first pair of displacement generating means deflect in such a manner that they become convex on the right side and the second pair of displacement generating means deflect in such a manner that they become convex on the left side. As a result, the movable part 44 displaces rotationally in the clockwise direction around the Z-axis that passes through the movable part 44 and is vertical to the plane of the actuator.

If, in the embodiment shown in FIG. 6, the position relation of the contracting displacement generating means to the elongating displacement generating means is specularly symmetric with respect to the X-axis, the movable part then displaces linearly. If this position relation is rotationally symmetric with respect to the Z-axis, the movable part then displaces rotationally.

If, upon the aforesaid linear or rotational displacement, the order of the contracting displacement generating means and elongating displacement generating means is reverse to that mentioned above, the direction of deflection of the displacement generating means is reverse, and so the movable part 44 displaces linearly in the left-handed direction or rotationally in the counterclockwise direction.

Regarding the embodiment shown, the directions of elongation and contraction of each pair of displacement generating means have been described as being parallel with each other. However, the directions of elongation and contraction of each pair of displacement generating means need not be parallel with each other, and so are two displacement generating means forming each pair. In other words, it is essentially required that the direction of elongation and contraction of each displacement generating means be not parallel with the end direction of displacement (the X-axis direction in FIG. 6). In short, only the opposite arrangement of the first and second pairs is needed with the X-axis positioned between them; no particular limitation is imposed on the angle between both pairs, and the angle between both displacement generating means forming each pair. In some cases or for the purpose of rigidity improvements, it is acceptable to make both pairs or both displacement generating means forming each pair nonparallel with each other.

In the embodiment shown in FIG. 6, it is noted that one displacement generating means of each pair may be made up of a beam member that does neither elongate nor contract, as is the case with the embodiment shown in FIG. 2. Even in this case, it is possible to displace the movable part linearly or rotationally.

The operating principle of the actuator shown in FIG. 6 is identical with that of the actuator shown in FIG. 2 in respect of making use of the deflection of the displacement generating means. With the actuator embodiment shown in FIG. 6 wherein the movable part is supported from two opposite directions (from above and from below in the illustrated state), there is a rigidity increase in the plane direction and a direction (flying direction) vertical to the plane. For this reason, when acceleration is added to the slider via external force due to its contact with the disk medium or impacts on the system, the deflection of the slider in the plane direction or a direction vertical thereto becomes small.

Figure 8:
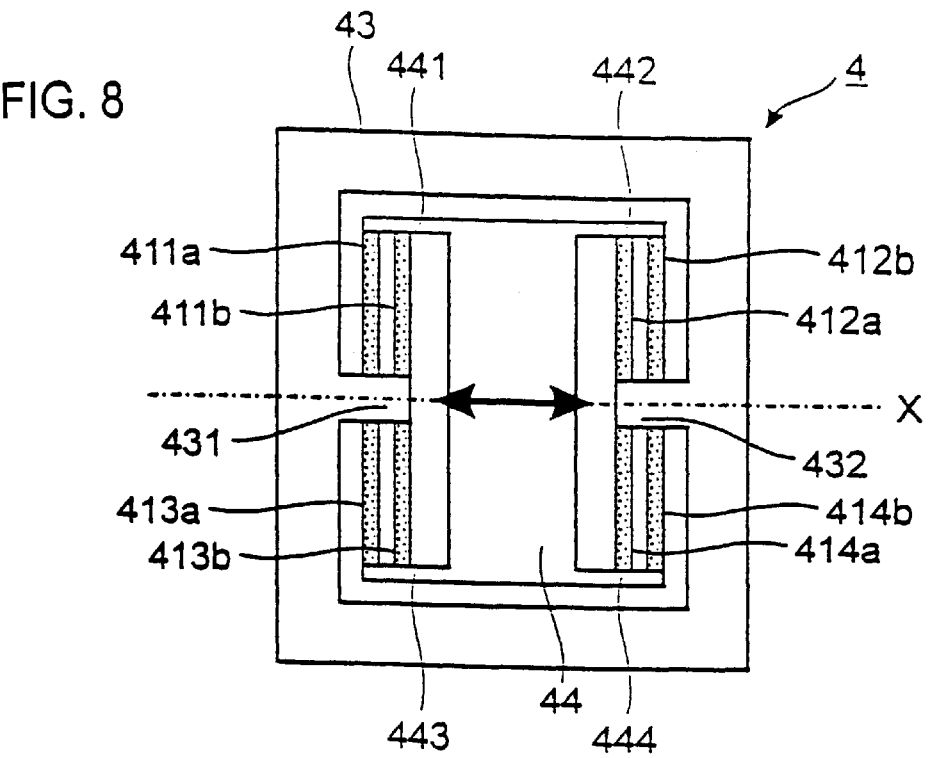
FIG. 8 is a plan schematic illustrative of another embodiment of the actuator in the magnetic head according to the present invention.

Illustrated in FIG. 8 is a further actuator embodiment wherein, upon the elongation and contraction of displacement generating means, they deflect and a movable part displaces linearly with respect to a fixed part in the plane of the aforesaid sheet-like member.

An actuator 4 shown in FIG. 8 comprises a frame form of fixed part 43 in which enclosed are a movable part 44 and four pairs of displacement generating means, each pair comprised of two parallel displacement generating means, i.e., a first pair (of displacement generating means 411a and 411b), a second pair (of displacement generating means 412a and 412b), a third pair (of displacement generating means 413a and 413b), and a fourth pair (of displacement generating means 414a and 414b). The directions of elongation and contraction of each pair of displacement generating means are parallel with each other. However, in the embodiment shown in FIG. 8, too, the directions of elongation and contraction of each pair of displacement generating means need not be parallel with each other, and so are two displacement generating means forming each pair, as is the case with the embodiment shown in FIG. 6. In other words, it is essentially required that the direction of elongation and contraction of each displacement generating means be not parallel with the end direction of displacement (the X-axis direction in FIG. 8).

In a plane of the actuator shown in FIG. 8, let an X-axis be defined as an axis that passes through the movable part 44 and is vertical to the direction of elongation and contraction of the displacement generating means. On one side (the upper side of FIG. 8) of the X-axis the movable part 44 is sandwiched between the first and second pairs at air spacings, and on the other side (the lower side of FIG. 8) the movable part 44 is sandwiched between the third and fourth pairs at air spacings.

The fixed part 43 comprises fixed connectors 431 and 432 for coupling together the displacement generating means. These connectors extend toward the movable part 44 along the X-axis to sandwich the movable part 44 therebetween at air spacings. The movable part 44 comprises movable connectors 441, 442, 443 and 444 for coupling together the displacement generating means. The movable connectors 441 and 442 extend from one end of the movable part 44 parallelly with the X-axis, and the movable connectors 443 and 444 extend from the other end of the movable part 44 parallelly with the X-axis. The first pair is coupled at one end to the fixed connector 431 and at the other end to the movable connector 441, the second pair is coupled at one end to the fixed connector 432 and at the other end to the movable connector 442, the third pair is coupled at one end to the fixed connector 431 and at the other end to the movable part 443, and the fourth pair is coupled at one end to the fixed connector 432 and at the other end to the movable connector 444.

Assume here that, upon the startup of the actuator, the displacement generating means 411a, 412a, 413a and 414a located on one sides of the respective pairs (on the left side of FIG. 8) are contracted while the displacement generating means 411b, 412b, 413b and 414b on the other sides of the respective pairs (on the right side of FIG. 8) are elongated. Then, each displacement generating means deflects in the left-handed direction so that the movable part 44 displaces linearly in the left-handed direction. When the contracting, and elongating displacement generating means are in reverse order, on the other hand, the direction of deflection of the displacement generating means is so reverse that the movable part 44 displaces linearly in the right-handed direction.

In the embodiment shown in FIG. 8, it is noted that one displacement generating means of each pair may be made up of a beam member that does neither elongate nor contract, as is the case with the embodiment shown in FIG. 2. Even in this case, it is possible to displace the movable part linearly.

Preferably, the rigidity of the movable connectors 441, 442, 443 and 444 is decreased in the plane direction, as shown. This is to allow the elongation and contraction of the displacement generating means to occur in an undisturbed manner.

The operating principle of the actuator shown in FIG. 8 is identical with that of the actuator shown in FIG. 6 in respect of making use of the deflection of the displacement generating means. However, this actuator is more preferable than the actuator shown in FIG. 6 because higher rigidity and larger driving force are available due to the use of more pairs of displacement generating means.

Figure 9:
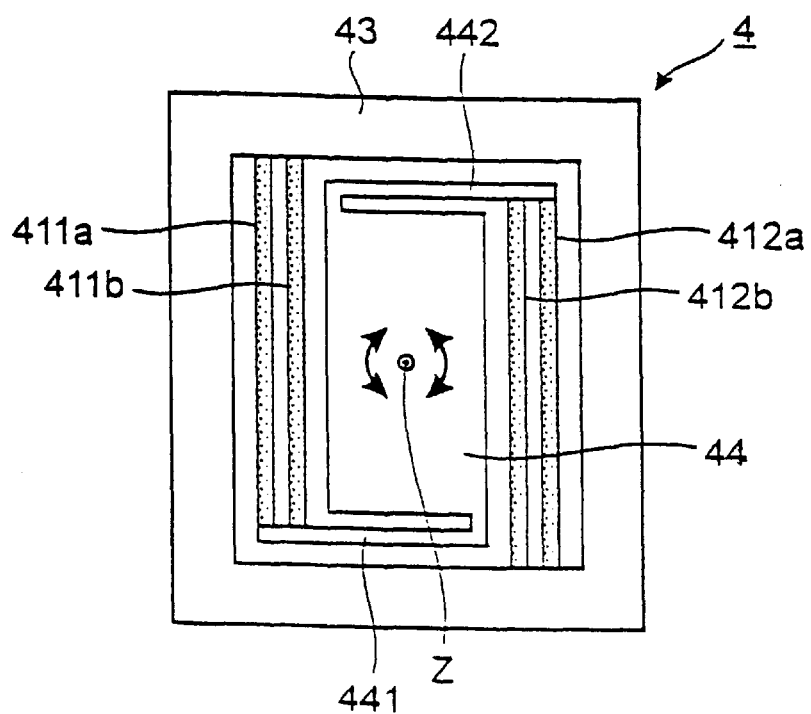
FIG. 9 is a plan schematic illustrative of a further embodiment of the actuator in the magnetic head according to the present invention.

Illustrated in FIG. 9 is a further actuator embodiment wherein, upon the elongation and contraction of displacement generating means, they deflect and a movable part displaces rotationally with respect to a fixed part in a plane of the aforesaid sheet-like member.

An actuator 4 shown in FIG. 9 comprises a frame form of fixed part 43 in which enclosed are a movable part 44 and two pairs of displacement generating means, each comprised of two parallel displacement generating means, i.e., a first pair (of displacement generating means 411*a* and 411*b*) and a second pair (of displacement generating means 412*a* and 412*b*). The directions of elongation and contraction of each pair of displacement generating means are parallel with each other.

A Z-axis of the actuator is here defined as a straight line that is vertical to its plane and passes through the movable part 44. The movable part 44 is located between the first and second pairs at air spacings. Junctures between the respective pairs and the movable part are in positions symmetric with respect to the Z-axis, and junctures between the respective pairs and the fixed part, too, are in positions symmetric with respect to the Z-axis.

In this actuator embodiment, too, the directions of elongation and contraction of each pair of displacement generating means need not be parallel with each other. This is also true of two displacement generating means forming each pair. In other words, it is essentially required that the junctures between the respective pairs and the movable part be opposite to each other with the Z-axis positioned therebetween, and that the junctures between the respective pairs and the fixed part be opposite to each other with the Z-axis positioned therebetween.

The movable part 44 comprises movable connectors 441 and 442 for coupling together the displacement generating means. These connectors 441 and 442 are opposite to each other with the Z-axis positioned between them. The connectors 441 and 442 extend in such a manner that, at one end and the other end of the movable part 44, they intersect the direction of elongation and contraction of the displacement generating means at right angles. The first pair is coupled at one end to the fixed part 43 and at the other end to the movable connector 441, and the second pair is coupled at one end to the fixed part 43 and at the other end to the movable connector 442.

Assume here that, at the startup of this actuator, the displacement generating means 411*a* and 412*a* in the respective pairs, located relatively away from the Z-axis, are contracted and the displacement generating means 411*b* and 412*b* located relatively near to the Z-axis are elongated. Then, each pair deflects in a direction farther away from the Z-axis, so that the movable part 44 displaces rotationally in the clockwise direction around the Z-axis. When the contracting, and elongating displacement generating means are in reverse order, however, the direction of deflection of the displacement generating means is reverse, so that the movable part 44 displaces rotationally in the counterclockwise direction.

In the embodiment shown in FIG. 9, it is noted that one displacement generating means of each pair may be made up of a beam member that does neither elongate nor contract, as is the case with the embodiment shown in FIG. 2. Even in this case, it is possible to displace the movable part rotationally.

The rigidity of the movable connectors 441 and 442 in the plane direction is decreased for the same reason as mentioned in connection with the movable connectors shown in FIG. 8.

The operating principle of the actuator shown in FIG. 9 is the same as that of the actuator shown in FIG. 2 in respect of making use of the deflection of the displacement generating means. With the actuator embodiment shown in FIG. 9, however, higher rigidity is available due to the supporting of the movable part from two opposite directions and the provision of more displacement generating means.

Figure 10:
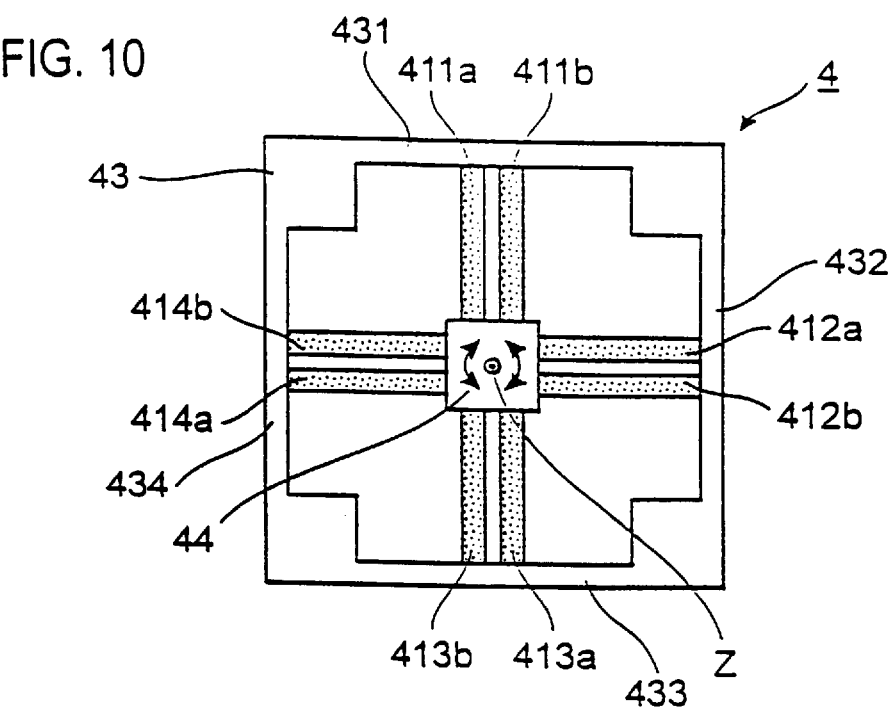
FIG. 10 is a plan schematic illustrative of a still further embodiment of the actuator in the magnetic head according to the present invention.

Illustrated in FIG. 10 is a further actuator embodiment in which, upon the elongation and contraction of displacement generating means, they deflect and a movable part displaces rotationally with respect to a fixed part in a plane of the aforesaid sheet-like member.

An actuator 4 shown in FIG. 10 comprises a frame form of fixed part 43 in which enclosed are a movable part 44 and four pairs of displacement generating means, each comprised of two parallel displacement generating means, i.e., a first pair (of displacement generating means 411*a* and 411*b*), a second pair (of displacement generating means 412*a* and 412*b*), a third pair (of displacement generating means 413*a* and 413*b*), and a fourth pair (of displacement generating means 414*a* and 414*b*). The respective pairs extend radially from the movable part 44 at 90° intervals in such a manner that the first pair opposes to the third pair and the second pair opposes to the fourth pair. Then, these pairs are connected to fixed connectors 431, 432, 433 and 434 in the fixed part 43.

In a plane of this actuator, let a Z-axis be defined as an axis that is vertical to the plane and passes through the movable part 44. Assume here that, the displacement generating means 411*a*, 412*a*, 413*a* and 414*a* located on one sides of the respective pairs with respect to the Z-axis (on the left side of FIG. 10 with respect to the Z-axis) are contracted and the displacement generating means 411*b*, 412*b*, 413*b* and 414*b* located on the other sides with respect to the Z-axis (on the right side of FIG. 10 with respect to the Z-axis) are elongated. Then, each displacement generating means deflects in the direction of the aforesaid one sides with respect to the Z-axis, so that the movable part 44 displaces rotationally in the clockwise direction. When the contracting, and elongating displacement generating means are in reverse order, however, the direction of deflection of the displacement generating means is so reverse that the movable part 44 displaces rotationally in the counterclockwise direction.

In the embodiment shown in FIG. 10, it is noted that one displacement generating means of each pair may be made up of a beam member that does neither elongate nor contract, as is the case with the embodiment shown in FIG. 2. Even in this case, it is possible to displace the movable part rotationally.

Like the fixed connectors 431 and 432 shown in FIG. 6, the fixed connectors 431, 432, 433 and 434 should deflect in such a manner that the elongation and contraction of each displacement generating means occur in an undisturbed manner As shown, therefore, their width is made narrow with a decrease in their rigidity in the plane direction. It is here noted that the structure of the fixed connectors are not always limited to that shown. For instance, like the fixed connectors shown in FIG. 6, they may be formed by providing a slit-like hole in the frame form of fixed part.

The operating principle of the actuator shown in FIG. 10 is the same as that of the actuator shown in FIG. 6 in that the movable part displaces rotationally. In other words, the position relation of the contracting displacement generating means to the elongating displacement generating means is rotationally symmetric with respect to the Z-axis, so that the movable part displaces rotationally. However, the actuator embodiment shown in FIG. 10 is more preferable than that shown in FIG. 6 because higher rigidity and larger driving force are available due to the fact that the movable part is supported from four directions, and more displacement generating means are used.

The actuator embodiments shown in the figures mentioned above, the fixed part extends within the plane of the actuator in such a manner that the displacement generating means and movable part are enclosed. Use of such a frame form of fixed part makes an easy-to-handle actuator possible. For instance, when the actuator is gripped as by a pincette, it is possible to avoid damage to the displacement generating means because the frame portion of the fixed part can be gripped. Use of the frame form of fixed part also contributes to reductions of damage to the actuator due to runaway, etc. In addition, since there is an increase in the bonding area allowed for fixing the actuator to its substrate, high bonding strength is available with ease of bonding and mounting operations. Furthermore, the fixed part is coupled to a thin sheet form of suspension, and so the rigidity of the juncture can be increased.

While the fixed part in each of the aforesaid actuator embodiments has been described as being constructed of a frame form of member in which the displacement generating means and movable part are completely enclosed, it is understood that any form of fixed part may be used, provided that it allows displacement. For instance, it is acceptable to provide a cutout in a portion of the fixed part, if required. Alternatively, it is acceptable to use a non-frame form of fixed part, as can be seen from a specific embodiment that will be described with reference to FIG. 11.

In the actuator shown in FIGS. 2, 3, 4, 5, 6, 8, 9, and 10, at least two hole parts are provided in a sheet-like member formed of a piezoelectric or electrostrictive material to form the fixed part 43, movable part 44 and at least two beam members for connecting them together as an integrated single piece. Electrode layers are formed on at least one portion of at least one beam member in such a manner that the elongation and contraction thereof occur in the direction of connecting the fixed and movable parts 43 and 44, thereby constituting displacement generating means. Upon the elongation and contraction of the displacement generating means, they deflect and the movable part displaces circularly, rotationally or linearly with respect to the fixed portion in the plane of the aforesaid sheet-like member.

Embodiments of the Invention Wherein the Actuator is Located on the Side of the Slider An actuator shown in FIG. 11 comprises two rod-like displacement generating means 41 for coupling fixed and movable parts 43 and 44 together, with the sides of the movable part 44 bonded to the sides of a slider 2. This actuator is similar in construction to the actuator shown in FIG. 2 with the exception that the fixed part 43 is not in a frame form.

In an actuator embodiment shown in FIG. 12, an actuator is built up of a fixed part 43, and movable parts 44 provided at tips of two rod-like displacement generating means 41 extending from the fixed part 43. The respective movable parts 44 are coupled to a pair of opposite sides of the slider 2 in such a manner that the slider 2 is sandwiched between both displacement generating means. Like the embodiment shown in FIG. 2, this embodiment makes use of the deflecting displacement of the displacement generating means, with an electromagnetic transducer element 1 displacing circularly.

In the embodiments wherein the actuator is located on the side of the slider, the actuator is thinner than the slider, as illustrated. Consequently, it is unlikely that the thickness of the magnetic head may increase, or the actuator may come into contact with the disk medium.

In some cases, the actuator may be equal to or larger than the slider in terms of thickness. If, in this case, the actuator is located on the side of the slider, it is then possible to reduce the thickness increase of the magnetic head by a size A at which the slider 2 and the actuator 4 overlap in the thickness-wise direction (see FIG. 13).

In the actuator shown in FIG. 11, and 12, too, the fixed part 43, movable part 44 and displacement generating means 41 are formed as an integrated single piece by providing holes or cutouts in a sheet-like member formed of a piezoelectric or electrostrictive material.

Embodiments of the Invention Wherein the Actuator is Located in a Space Formed by a Step Provided on the Slider Referring to FIG. 14, cutting or the like is used to provide a step on a back surface of a cuboidal slider 2 in such a manner that there is left a room available for the formation of an electromagnetic transducer element 1, and an actuator 4 is located within a space 21 defined by the step. This embodiments is effective for reducing the thickness increase of the magnetic head due to the provision of the actuator, and reducing the mass of the slider as well.

Referring then to FIG. 15, two steps are provided on a back surface of a slider 2, whereby a groove form of space 21 is formed in a substantially center position of the back surface of the slider 2. An actuator 4 is located in the space 21. This embodiment does not only have the advantages mentioned concerning the embodiment shown in FIG. 14 but is also improved in terms of mass balance, and so is more preferable for displacement characteristics.

While the actuator embodiment shown in FIG. 2 has been used in the embodiments shown in FIGS. 14 and 15, it is understood that use of other actuators may also be acceptable.

Embodiments of the Invention Wherein the Suspension is Located Between the Slider and the Actuator When positioning operation is performed by swinging a magnetic head by means of VCM, it is not preferable that there is a mass imbalance between the upper and lower surfaces of a suspension because the undisturbed, and stable operation of a slider is not achieved due to distortion or moment. According to a magnetic head embodiment shown in FIG. 16 wherein an actuator 4 is located on an upper surface of a suspension 3 and a slider 2 is located on a lower surface of the suspension 3, the aforesaid imbalance is so eliminated to such an extent that the stable operation of the slider 2 is ensured. If, in this embodiment, the mass of the actuator 4 is much the same as that of the slider 2, it is then possible to substantially eliminate the aforesaid imbalance because, as illustrated in FIG. 17, the center of gravity G of a structure comprising slider 2 and actuator 4 is positioned in the vicinity of a line extending from the surface of the suspension 3. This embodiment may be applied to other actuators as well.

In the embodiment illustrated, it is noted that to provide a space for receiving the suspension 3 between the slider 2 and the actuator 4, a projection form of connector 2a is integrally provided on the back surface of the slider 2 for bonding to the actuator 4. Generally speaking, it is preferable to provide such a projection or form a cutout in the back surface of the slider 2, as illustrated in FIG. 14, thereby achieving a structure in which the slider and connector form an integrated single piece. However, it is also preferable to use an independent connector similar in shape to the connector 2a for the purpose of coupling the slider and actuator together. Alternatively, it is acceptable to form a connector as illustrated on the actuator as an integrated single piece. Still alternatively, it is acceptable to use a portion of the suspension as a connector, as will be described with reference to FIG. 21.

Embodiments of the Invention Wherein the Actuator is Coupled to the Gimbal Part of the Suspension Usually, a gimbal mechanism such as a flexure is mounted in the vicinity of a tip of the suspension to allow the slider to follow fluctuations in the surface of the disk medium. Some exemplary applications of the present invention to a magnetic head having such a gimbal mechanism are illustrated in FIGS. 18A, 19A, 20A and 21A.

Figure 20A:
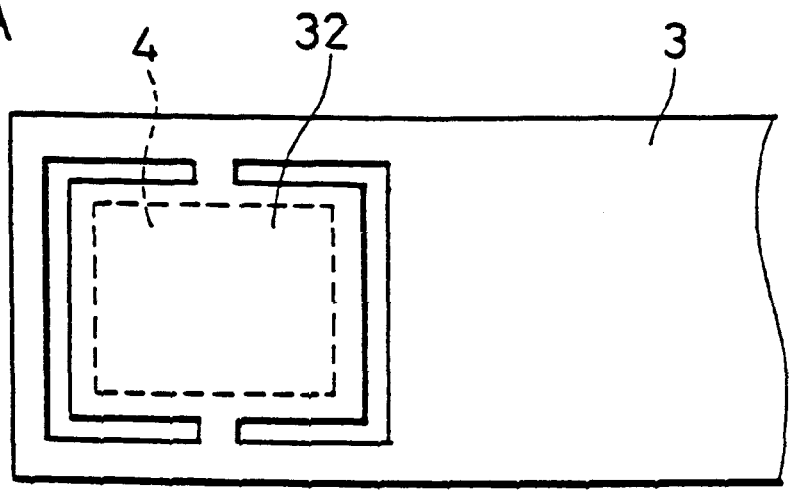
FIG. 20A is a side schematic illustrative of a further embodiment of the invention wherein the slider is coupled to a gimbal part of the suspension in the magnetic head according to the present invention.
Figure 20B:
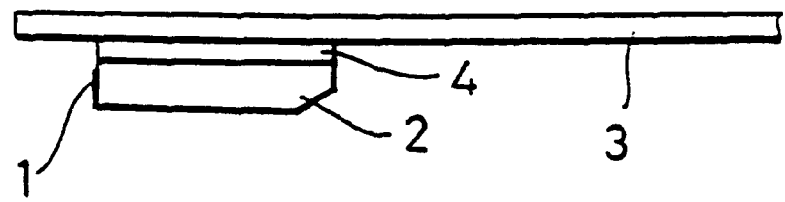
FIG. 20B is a side schematic of that embodiment.

A conventional suspension 3 having a flexure 31 coupled thereto to form a gimbal part is illustrated in a plan schematic of FIG. 18A and a side schematic of FIG. 18B. In an embodiment shown in a plan schematic of FIG. 19A and a side schematic of FIG. 19B, and in an embodiment shown in a plan schematic of FIG. 20A and a side schematic of FIG. 20B, a punched-out groove is provided in a suspension 3 as by etching to form a gimbal part 32. In either case, an actuator 4 is coupled to the gimbal part in the suspension 3 in such a manner that the gimbal part can perform its gimbal function in an undisturbed fashion. Such embodiments enable the gimbal part to absorb distortions or stresses generated by the following motion of the slider with respect to the surface of the disk medium, so that the application of harmful external force on the actuator can be avoided, resulting in improvements in the ability of the actuator to displace, and the reliability of the actuator. Of the gimbal embodiments shown, those shown in FIGS. 19A and 20A are preferred because the gimbals can have high rigidity in the displacing, and driving directions of the slider 2, with the embodiment shown in FIG. 20A being most preferred. When the suspension having the gimbal part shown in FIG. 19A, and FIG. 20A, respectively, is used, it is possible to locate the suspension between the slider and the actuator.

Figure 21:
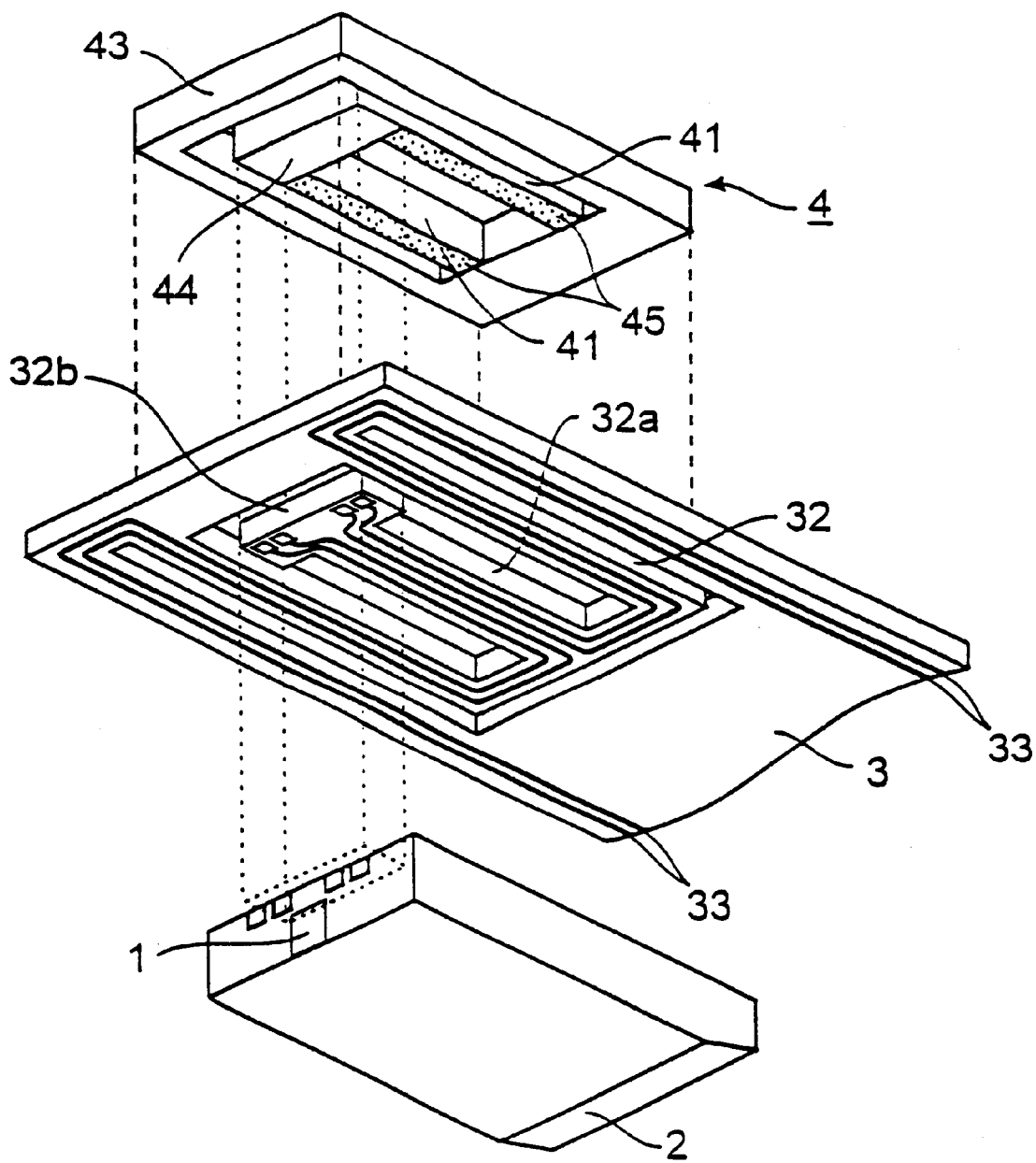
FIG. 21 is a perspective schematic illustrative of one embodiment of the invention wherein the actuator is coupled to the slider with a gimbal part of the suspension sandwiched between them.

In an embodiment shown in FIG. 21, a slider 2 and an actuator 4 are located in place with a gimbal part 32 in a suspension 3 positioned between them. This gimbal part 32 is formed by providing a punched-out groove in the suspension 3. By the provision of the punched-out groove, the gimbal part 32 is provided with a T-shaped connector. This connector is made up of a support portion 32a that corresponds to a vertical bar of the letter T and is contiguous to the gimbal part 32, and a connecting portion 32b that corresponds to a transverse bar of the letter T. The connecting portion 32b is bonded on the front side to a movable part 44 of the actuator 4 and on the back side to the slider 2. The rigidity of the support portion 32a is decreased in such a manner that the displacement of the movable part 44 occurs in an undisturbed manner. The connecting portion 32b in this embodiment is regarded as a rigid body in a state where it is bonded to the movable part 44 and slider 2, and so the advantages and features of the present invention are not affected whatsoever.

It is here noted that it is unnecessary to connect the connecting portion 32b to the gimbal part 32 by the support portion 32a. In other words, it is acceptable to locate only the connecting portion 32b between the actuator 4 and the slider 2, as in the case of the connector 2a in the embodiment shown in FIG. 16.

In the practice of the present invention, inter-connections to the actuator and/or the electromagnetic transducer element are preferably carried out by providing a conductor pattern on the suspension. In the embodiment shown in FIG. 21, four interconnection patterns 33 to be connected to an electromagnetic transducer element 1 are formed on the lower surface of the suspension.

Embodiments of the Invention Wherein the Amount of Displacement is Amplified

The amount of displacement (the amount of contraction of displacement generating means) generated by inverse piezoelectric effect or electrostrictive effect is very small. In the present invention, however, when the movable part is displaced making use of the deflection of the displacement generating means, it is possible to make the amount of displacement of a juncture between the slider and the actuator (the movable part in the actuator) larger than the amount of elongation and contraction of the displacement generating means. In other words, the actuator itself can have displacement enlarging function. When the movable part displaces circularly or rotationally in the practice of the present invention, it is possible to mechanically enlarge the displacement of the electromagnetic transducer element by allowing the movable part and electromagnetic transducer element to have an appropriate position relation. By such displacement enlargement, it is possible to bring the amount of displacement of the electromagnetic transducer element up to practical levels.

Embodiments wherein the actuator itself has displacement amplifying function, for instance, are illustrated in FIGS. 2, 4, 5, 6, 8, 9, 11 and 12.

Figure 22B:
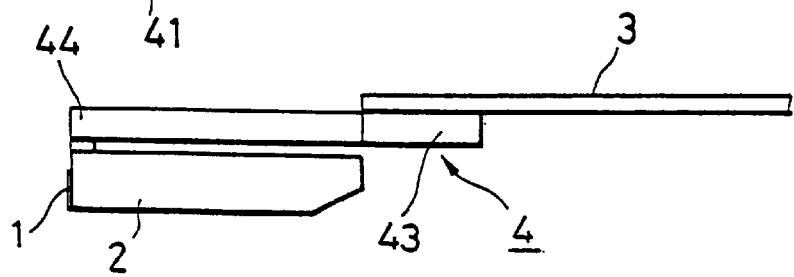
FIG. 22B is a side schematic of that embodiment.

An actuator 4 shown in FIG. 22A is an embodiment of the present invention wherein the actuator itself has displacement enlarging function. FIGS. 22A and 22B are a plan schematic and a side schematic, respectively. Like the actuator shown in FIG. 2, the actuator 4 illustrated has a movable part 44 circularly displaceable by the deflection of a beam member. Assume here that only one displacement generating means 41 contracts in an amount of contraction A. It is then possible to make an amount of displacement B of the movable part 44 that is a juncture with the slider larger than the amount of contraction A. It is noted that the amount of displacement of the movable part 44 is much the same as that of an electromagnetic transducer element 1. For instance, consider the case where both displacement generating means are 1 mm in length, 0.1 mm in width and 0.2 mm in thickness, a slit-like hole between them is 0.1 mm in width, and the amount of contraction of them is about 0.2 μm. In this case, the amount of displacement of the movable part (the amount of its displacement in a direction intersecting at right angles with the lengthwise direction of the displacement generating means) is about 0.5 μm or, in another parlance, the magnification of displacement is about 2.5. In FIGS. 22A and 22B, arrows indicate the direction of contraction of the displacement generating means 41 and the direction of displacement of the movable part 44.

In an actuator embodiment with the rotational displacement of a movable part as typically shown in FIG. 4, that the amount of displacement of the movable part is larger than the amount of elongation and contraction of displacement generating means implies that the amount of displacement of the movable part in the vicinity of a juncture with the displacement generating means is larger than the amount of elongation and contraction of the displacement generating means.

Figure 23B:
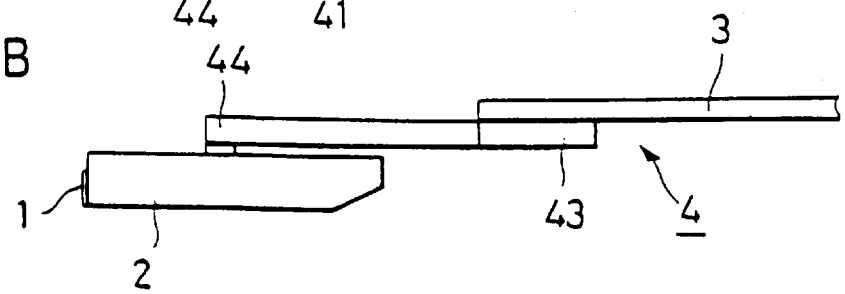
FIG. 23B is a side schematic of that embodiment.

Embodiments wherein the movable part displaces circularly or rotationally while the amount of its displacement can be mechanically enlarged or with a mechanically enlarged amount of its displacement are shown in FIGS. 2, 3, 4, 5 and 6 (illustrative of rotational displacements) as well as in FIGS. 9, 10, 11 and 12. When the movable part displaces circularly or rotationally, the electromagnetic transducer element displaces circularly in concentric relation to the displacement of the movable part. If the slider is coupled to the movable part in such a manner that the radius of rotation of circular displacement of the electromagnetic transducer element becomes larger than the radius of rotation of circular or rotational displacement of the movable part, it is then possible to make the amount of displacement of the electromagnetic transducer element larger than that of the juncture between the slider and the movable part. FIG. 23A is a plan schematic illustrative of an embodiment wherein a juncture between a movable part 44 and a slider 2 is at a position farther off an electromagnetic transducer element 1 than the juncture shown in FIG. 22A, and FIG. 23B is a side schematic of that embodiment. By make a distance of the electromagnetic transducer element 1 from the center of circular displacement longer than that of the movable part 44 as shown, it is possible to make an amount of displacement C of the electromagnetic transducer element 1 larger than an amount of displacement B of the movable part 44. Assume here that the size of the actuator is the same as that explained with reference to FIG. 22A. If, for instance, the position of the juncture between the movable part 44 and the slider 2 is spaced 0.5 mm away from the electromagnetic transducer element 1, the amount of displacement C is about 1.5 times as large as the amount of displacement B.

Details of the Actuator

Figure 24:
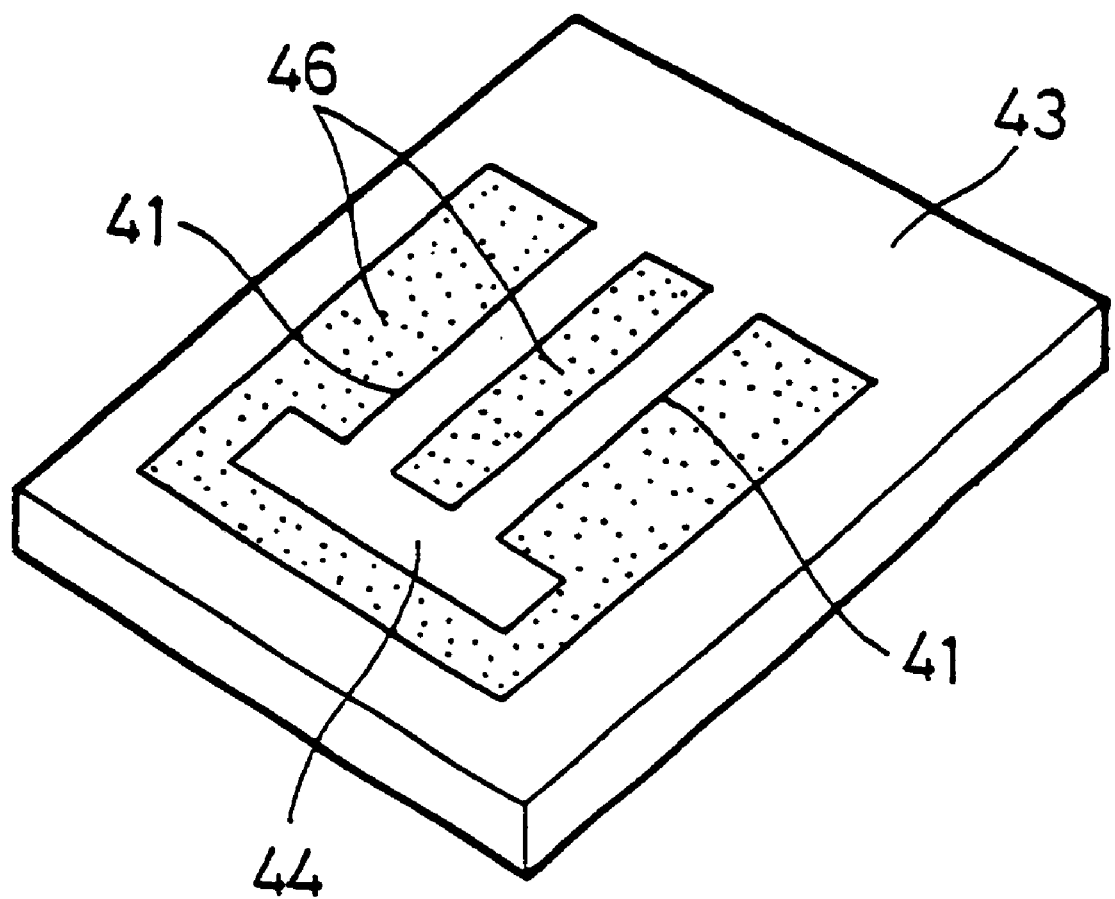
FIG. 24 is a perspective view illustrative of one embodiment of the actuator used with the magnetic head according to the present invention.

An actuator shown in FIG. 24 comprises a frame form of fixed part 43 similar in construction to that shown in FIG. 2, and two holes in the fixed part 43, which are filled with a flexible filler 46 in such a manner that it is confined in a plane of the actuator.

By filling the flexible filler in the holes as illustrated, vibration-damping effect is so achievable that adverse influences such as resonance and extraneous harmful vibrations on the actuator can be avoided. In addition, the mechanical strength and impact resistance of the actuator can be improved because the respective parts of the actuator are bridged together by the flexible filler.

In the embodiment shown in FIG. 24, electrode layers are built in displacement generating means 41. In this embodiment, the end faces of the electrode layers are exposed on both sides of the displacement generating means 41, but corrosion of the electrode layers can be prevented because both sides are covered with the flexible filler. Preferably, the flexible filler used should be resistant to electro-erosion.

In the practice of the present invention, it is also acceptable to fill the flexible filler in only one hole in the actuator.

According to this embodiment wherein the flexible filler is filled in the holes in such a manner that it is perfectly confined in the plane of the actuator, the amount of the filler filled is kept constant enough to prevent performance variations due to a variation in the amount of the filler filled. In addition, there is no substantial increase in the actuator thickness due to the filler filled.

No particular limitation is imposed on the type, hardness, and amount of the flexible filler used in this embodiment; a choice may be made from suitable fillers that have little influence on the displacement of the movable part, and can achieve improvements in vibration-damping performance, strength, and impact resistance. However, it is preferred to use flexible resins resistant to electro-erosion, e.g., silicone resin or urethane resin as the flexible filler.

When no flexible filler is provided, or when the electrode layers are exposed on the sides of each part not covered with the flexible filler, it is acceptable to provide covering layers on the sides of each part for the purpose of preventing corrosion of the electrode layers.

For an actuator making use of deflection in the plane direction such as one shown in FIG. 2, etc., it is preferable that the width of the beam member in section vertical to the direction of connecting the fixed and movable parts is smaller than the thickness thereof. This in turn enables the rigidity of the beam member in the plane direction of the actuator to be smaller than that in the thickness-wise direction. For this reason, the deflection of the beam member generated by the elongation and contraction of the displacement generating means 41 concentrates in the plane direction of the actuator, so making unnecessary displacements such as flapping unlikely to occur. The width-to-thickness ratio of the beam member is preferably about ½ to about ⅕ although not critical.

The aforesaid advantage is achievable if at least one beam member has such a width-to-thickness ratio as defined above. However, if all the beam members satisfy this width-to-thickness ratio condition, more remarkable advantages are then achievable. In view of symmetry, too, it is preferable that all the beam members satisfy this width-to-thickness ratio condition.

In the actuator embodiment shown typically in FIG. 2, it is noted that the narrower the spacing (the distance between the center lines of the beam members) between two beam members for connecting the fixed and movable parts 43 and 44 together, the larger is the amount of deflection of the beam members per unit amount of elongation and contraction of the displacement generating means and, hence, the larger is the amount of displacement of the movable part 44 per said unit amount of elongation and contraction. Also, the narrower the spacing between the aforesaid two beam members, the lower can be the driving voltage required to obtain a constant amount of displacement, and the smaller the width of the individual beam members, the narrower can be the spacing between the aforesaid two beam members. For this reason, conforming to the aforesaid width-to-thickness ratio condition is also effective for an increase in the amount of displacement, and a driving voltage reduction as well.

In the actuator shown in FIG. 2, 3, 6, 8, 10, 11, and 12, an axis of symmetry exists in its plane. Referring to FIG. 2, for instance, this axis is the X-axis that passes through a slit-like hole between two displacement generating means in their longitudinal direction. For this reason, the actuator can be used upside down, and so the mounting of the actuator to a magnetic head is much more facilitated.

The actuator shown in FIG. 4, 5, 6, 9, and 10, respectively, is rotationally symmetric with respect to the axis of symmetry (the Z-axis shown) that is vertical to the plane and passes through the center of the movable part 44 (for instance, diad symmetry in FIG. 4 and tetrad symmetry in FIG. 5), said axis of symmetry being in alignment with the center axis of rotational motion of the movable part 44. To mount the actuator on a magnetic head, therefore, only the alignment of the center axis of rotational motion with the given center position of rotation of the slider is needed; no critical limitation is placed on the angle of the actuator in its plane direction, and so mounting is much more facilitated.

Each of the embodiments shown makes use of the elongation and contraction of the displacement generating means due to piezoelectric transverse effect, as mentioned above. In the practice of the present invention, however, it is acceptable to make use of elongation and contraction in a direction in alignment with the direction of an electric field, i.e., elongation and contraction due to the so-called piezoelectric longitudinal effect. When the piezoelectric longitudinal effect is utilized, electrode layers are provided on the displacement generating means in such a manner that they are vertical to the direction of connecting the fixed and movable parts to each other. However, embodiments making use of the piezoelectric transverse effect are preferred because of ease of manufacture, and a mechanical strength increase of the actuator.

The size of each part in the actuator is not critical, and so may be determined depending on the construction, etc., of a magnetic head to which it is applied. Here suppose the actuator to be a sheet-like product. Then, one side of this sheet-like product is usually about 0.5 mm to about 3.0 mm in length and about 0.1 mm to about 0.5 mm in thickness. The displacement generating means is on the other hand about 0.3mm to about 2.5 mm in length. The amount of displacement is about 0.01 $\mu$m to about 5 $\mu$m as expressed by the distance of movement in the plane direction of the sheet-like product, and about 0.05° to about 2° as expressed by the angle of rotation. The driving voltage is usually about 3 V to about 100 V, preferably about 3 V to about 50 V.

By the term "piezoelectric or electrostrictive material" used herein is intended a material that elongates and contracts due to inverse piezoelectric effect or electrostrictive effect. The piezoelectric or electrostrictive material used in the present invention may be any material that can be applied to the displacement generating means in an actuator. However, it is usually preferable to use ceramic piezoelectric or electrostrictive materials such as PZT [Pb(Zr, Ti)O$_3$], PT (PbTiO$_3$), PLZT [(Pb, La)(Zr, Ti)O$_3$], and barium titanate (BaTiO$_3$) because of their high rigidity. An actuator, when it is constructed of a ceramic piezoelectric or electrostrictive material, can be easily fabricated using thick film technologies such as sheet-making, and printing processes. It is noted that the actuator may also be fabricated using thin film technologies. When the piezoelectric or electrostrictive material has a crystal structure, the crystal structure may comprise either polycrystals or single crystals.

How to form the electrode layers is not critical; a choice may be made from suitable processes such as baking of electroconductive pastes, sputtering, and evaporation while the processes of forming the piezoelectric or electrostrictive material layers are taken into account.

An actuator may have any structure in which at least one piezoelectric or electrostrictive material layer, having electrode layers on both sides, exists at the displacement generating means. However, it is preferable to use a multi-layer structure wherein two or more such piezoelectric or electrostrictive material layers are stacked one upon another. The amount of elongation and contraction of the piezoelectric or electrostrictive material layer is proportional to electric field intensity. However, the aforesaid multilayer structure makes it possible to make the piezoelectric or electrostrictive material layer so thin that the required electric field intensity can be obtained at a low voltage, and so the driving voltage can be lowered. At the same driving voltage as that used with a single layer structure, the amount of elongation and contraction can become much larger. The thickness of the piezoelectric or electrostrictive material layer is not critical, and so may be determined depending on various conditions such as driving voltage, the required amount of elongation and contraction, and ease of manufacture. However, a thickness of about 5 $\mu$m to about 50 $\mu$m is usually preferred in the practice of the present invention. Similarly, the upper limit to the number of piezoelectric or electrostrictive material layers stacked one upon another is not critical, and so may be determined in such a manner that displacement generating means having a desired thickness are obtainable. It is noted that such a covering piezoelectric or electrostrictive material layer as will be described later is usually provided on the outermost electrode layer.

For the purpose of simplification or clearly indicating areas for the displacement generating means, the shape of the electrode layers is roughly illustrated. Actually, however, internal electrodes layer of such structure as shown typically in FIG. 25A are connected with a terminal electrode, as shown in FIG. 25B.

Figure 25B:
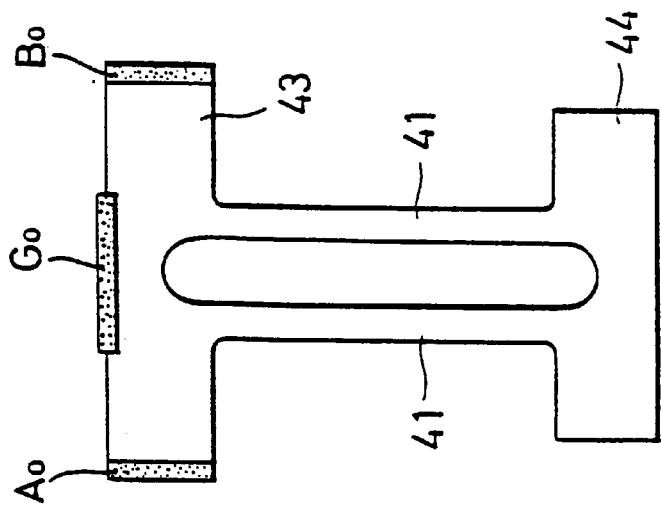
FIG. 25B is a plan schematic illustrative of one embodiment of terminal electrodes.
Figure 25A:
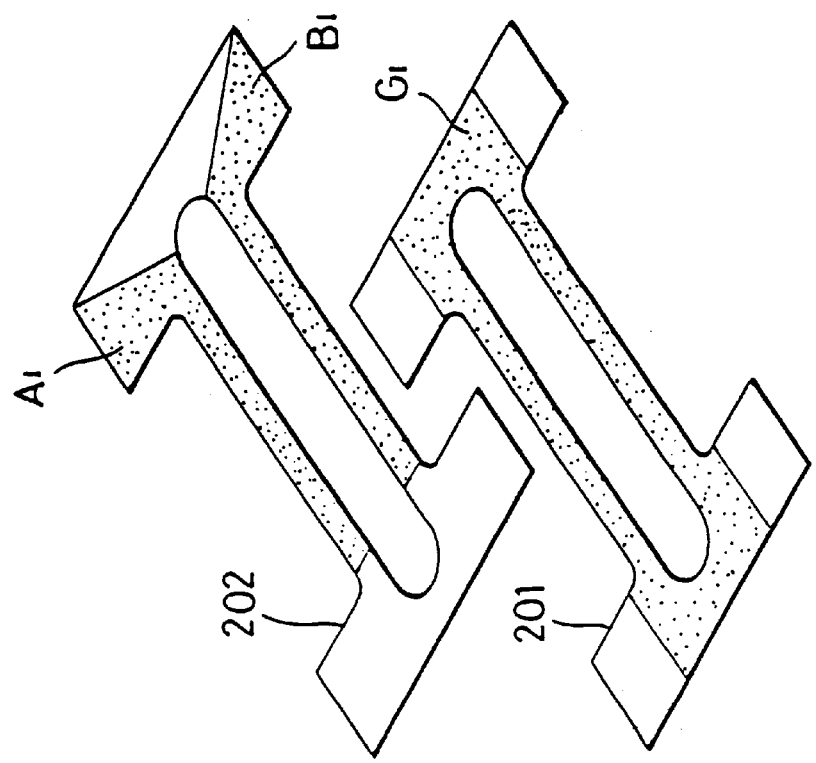
FIG. 25A is an exploded perspective schematic illustrative of one embodiment of internal electrode layers.

FIG. 25A illustrates piezoelectric or electrostrictive material layers 201 and 202 adjacent to each other in an actuator. The piezoelectric or electrostrictive material layer 201 is provided on its surface with an internal electrode layer G$_1$, while the piezoelectric or electrostrictive material layer 202 is provided on its surface with an internal electrode layer A1 and an internal electrode layer B$_1$. A combination of the internal electrode layers G$_1$ and A$_1$ and a combination of the internal electrode layers G$_1$ and B$_1$ provide a pair of electrode layers, each having a piezoelectric or electrostrictive layer sandwiched between them. In this embodiment, displacement is generated in various patterns as mentioned above, by controlling the voltage potential of the internal electrode layers A1 and B1 against the potential of the internal electrode layer G1, and by controlling the timing of application of voltage on the internal electrode layers A1 and B1.

FIG. 25B illustrates an example of terminal electrodes used in the case where the internal electrode layers shown in FIG. 25A are provided. In this example, a fixed part 43 is provided on its sides with terminal electrodes G$_0$, A$_0$ and B$_0$ for connection to the end faces of the internal electrode layers G$_1$, A$_1$ and B$_1$ exposed on the sides of the fixed part 43.

An actuator may consist only of piezoelectric or electrostrictive material layers, electrode layers, and flexible filler. However, it is acceptable to improve the performance and robustness of the actuator by putting a resilient sheet or a vibration-damping seal thereon.

Fabrication Process

Embodiments of the process of fabricating actuators used in the present invention will now be explained specifically with reference to the use of ceramic piezoelectric or electrostrictive materials.

For the fabrication of a sheet-like member of ceramic piezoelectric or electrostrictive material, it is preferable to use thick film technologies represented by sheet-making or printing processes, as in the case of multilayered ceramic chip capacitors, etc. A general aspect of a typical sheet-making process is here explained. First, the raw material such as ceramic powder, binder, and solvent are milled into a paste which is then compacted into a green sheet. Apart from this green sheet, the raw materials such as electroconductor, binder, and solvent are milled into an internal electrode layer paste. Then, the internal electrode layer paste is printed on the green sheet to form such a given pattern as shown typically in FIG. 25A. A given number of such sheets are stacked one upon another, and pressed together to form a multilayer structure. The multilayer structure is fired to obtain a thin sheet form of sintered member. This sintered member may be immediately shaped, as explained just below. However, it is also acceptable to cut the sintered member to a suitable size for shaping.

Then, the thin sheet form of sintered member is shaped to provide holes or cutouts. Usually, a plurality of actuators are cut out of the sintered member, and this cutting, too, is carried out simultaneously with shaping. For shaping, a photoresist layer is first formed all over the surface of the sintered member. After pattern-wise exposure, the photoresist layer is then developed to remove portions of the photoresist layer that are found at areas corresponding to a boundary site between adjacent actuators, holes, and cutouts. Then, portions that are not covered with the photoresist layer are removed by sandblasting to obtain a plurality of actuators having a desired shape. After the shaping, the photoresist is removed and, if required, terminal electrodes are formed. The terminal electrodes may be formed in ordinary manners such as baking, and evaporation.

Ultrasonic honing may also be used for shaping. In this case, ultrasonic honing is applied to the member to be shaped while the member is immersed in a solution with abrasive grains dispersed therein.

Shaping may be carried out prior to firing.

The ability of piezoelectric material to displace is generally improved by polarization treatment. In the practicle of the present invention, too, it is therefore preferable to make use of polarization treatment, as already mentioned. Usually, the polarization treatment is carried out by the application of a direct current voltage, making use of electrode layers in the fabricated actuator. However, this treatment may be performed at the stage of the aforesaid thin sheet form of sintered member.

For coupling the actuator to the suspension and slider, an adhesive is usually employed. For this purpose, however, it is preferable to use an adhesive that has high hardness upon bonding to prevent misalignment due to the vibration of the actuator, etc. Such adhesives, for example, include an epoxy adhesive.

Actuator Prototype

An actuator of the structure shown in FIG. 2 was made, using PZT (where the piezoelectric constant is $d_{31}=-250\times 10^{-12}$ m/V) as a piezoelectric or electrostrictive material and utilizing the aforesaid thick film process.

This actuator prototype had a multilayer structure built up of eight piezoelectric or electrostrictive material layers, each having a thickness of 20 μm and electrode layers on both sides, and two coverings, one for the uppermost layer and another for the lowermost layer, ten layers in all (with a total thickness of 0.2 mm). Displacement generating means were each 1 mm in length, 0.1 mm in width and 0.2 mm in thickness, a slit-like hole between both displacement generating means was 0.1 mm in width, and the displacement generating means were subjected to polarization treatment.

When a voltage of 20 V was applied on this actuator in the same direction as the direction of polarization, the amount of contraction of the displacement generating means was about 0.2 μm and the amount of displacement of the movable part (the amount of displacement in a direction intersecting at right angles with the lengthwise direction of the displacement generating means) was about 0.5 μm. When the aforesaid voltage was alternately applied on both displacement generating means, on the other hand, the amount of displacement of the movable part was about ±0.5 μm.

Driving Control Method in the Magnetic Head Positioning Mechanism

Figure 26:
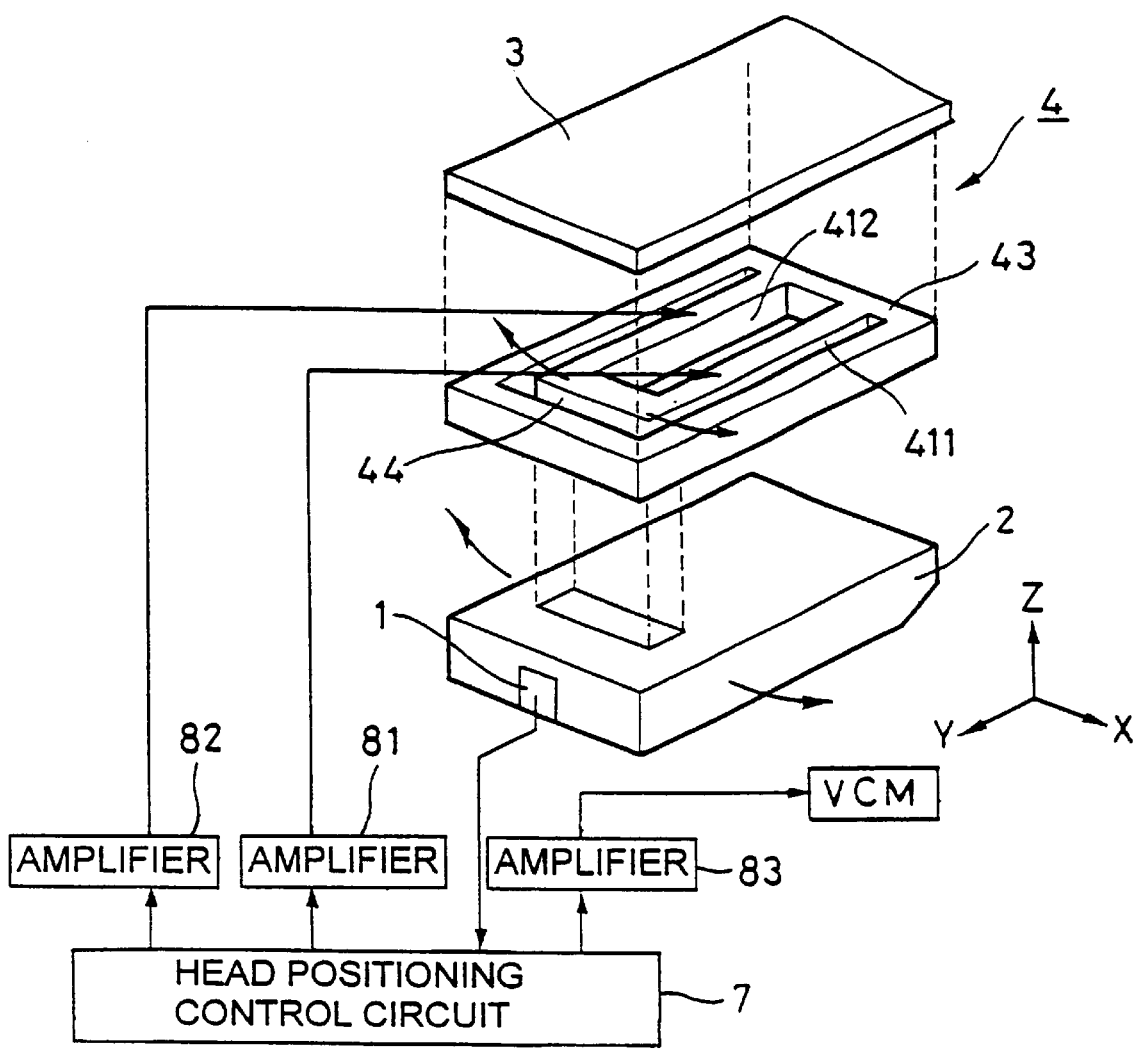
FIG. 26 is a perspective schematic illustrative of one typical basic construction of driving control in the magnetic head positioning mechanism.

A preferred control method for driving a magnetic head of such structure as shown in FIG. 26 is now explained. The driving control method explained herein is preferably applied to the presently invented magnetic head wherein an actuator is overall constructed of a piezoelectric or electrostrictive material in the form of an integrated single piece. However, it is understood that this driving control method may also be applicable to a magnetic head comprising an actuator of such structure that independently fabricated fixed and movable parts, and displacement generating means are assembled together, or an actuator that has such assembly structure and includes fixed and movable parts made up of a material other than the piezo-electric or electrostrictive material.

A magnetic head embodiment shown in FIG. 26 is similar in construction to that shown in FIG. 2. In connection with FIG. 26, it is noted that electrode layers in an actuator 4 are not shown.

In order to make positioning correction for an electromagnetic transducer element 1 in the embodiment shown in FIG. 26, a control signal for coarse motion and a control signal for micro-motion are generated by operation in a head positioning control circuit 7, and then amplified at amplifiers 81, 82 and 83, so that the amplified signals are applied in the form of driving voltage and current on displacement generating means 411 and 412 in the actuator 4 and VCM (not shown). This driving voltage in turn causes the elongation or contraction of the displacement generating means. Consequently, the electromagnetic transducer element displaces circularly in the plane direction of the actuator 4 or in an XY plane in FIG. 26, that is, in parallel with the surface of a disk medium.

In some practical cases, however, the electromagnetic transducer element also displaces in a direction vertical to the plane of the actuator 4, i.e., in the flying (Z-axis) direction. Such displacement in the flying direction is a secondary displacement which occurs when the actuator 4 is put in operation for positioning the electromagnetic transducer element. The displacement in the flying direction is tantamount to a fluctuation in the flying height, and may possibly lead to a head crash. It is thus of vital importance to control the displacement in the flying direction.

Figure 27:
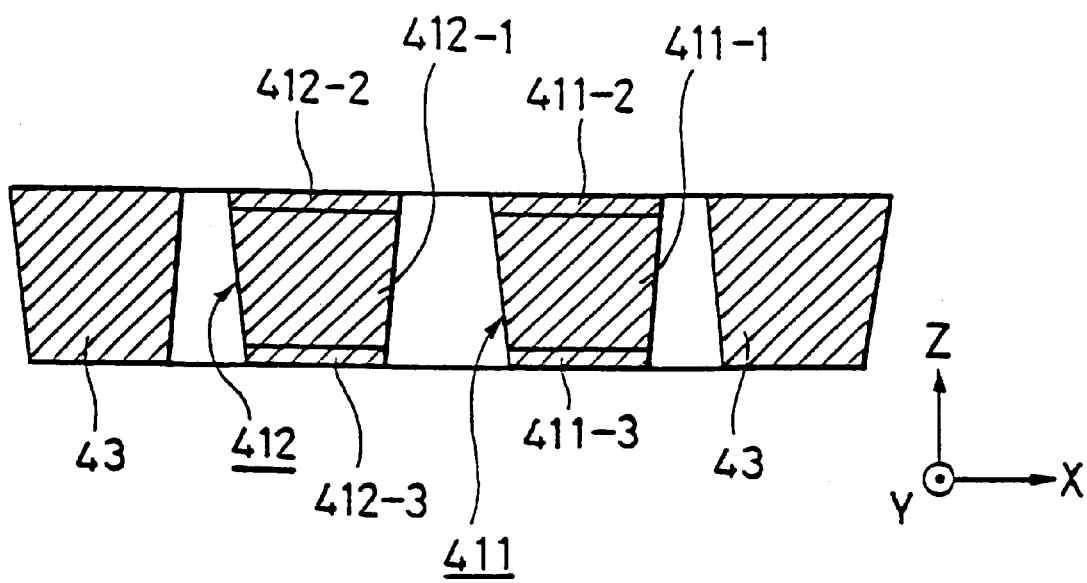
FIG. 27 is a sectional schematic of the actuator.

In the practice of the present invention, it is preferable to fabricate an actuator by making a sheet-like member of a ceramic piezoelectric or electrostrictive material by thick film technologies, then firing the sheet-like member, and finally providing cutouts or holes in the sheet-like member, as explained above. When the actuator is fabricated by the shaping of the sheet-like member, there is no assembly error. In some cases, however, the thus fabricated actuator, too, is susceptible to variations in the shape and material property of the displacement generation means, and inducing asymmetry in a direction vertical to the direction of elongation and contraction of the displacement generating means. In the presence of such variations and asymmetry, displacement tends to occur in directions other than the desired direction when the displacement generating means elongate and contract. For instance, it is difficult to shape the sides of the displacement generating means in such a manner that they are perfectly vertical to the plane of the multilayer structure because of various factors such as the gradual slenderization of the photoresist during sandblasting, sandblasting time and angle, and a hardness difference between the piezoelectric or electrostrictive material and the aforesaid coverings. FIG. 27 is a sectional schematic of an X-Z plane including the displacement generating means 411 and 412 shown in FIG. 26. As can be seen from FIG. 27, when sandblasting was carried out in a direction of +Z, the photoresist became gradually slender to such a degree that the respective sections of the displacement generating means 411 and 412 took a trapezoidal form.

The displacement generating means 411, and 412 shown in FIG. 27 comprises a displacement part 411-1, and 412-1 formed of a piezoelectric or electrostrictive material with electrode layers located on both sides, a pair of coverings 411-2 and 411-3 with the displacement part 411-1 sandwiched therebetween, and a pair of coverings 412-2 and 412-3 with the displacement part 412-1 sandwiched therebetween. A pair of coverings (411-2 and 411-3, and 412-2 and 412-3) in each displacement generating means have the same thickness, but differ in width by sandblasting. With the elongation and contraction of the displacement generating means by the application of voltage thereon, there is also a displacement in the stacking direction due to a width difference between the upper and lower coverings between which the displacement part is sandwiched. Here consider the case where the displacement generating means 411 and 412 have such a sectional shape as shown in FIG. 27. Upon the contraction of either one of the displacement generating means shown in FIG. 26, the electromagnetic transducer element 1 displaces not only in the direction shown by arrows in FIG. 26 but also in a direction of −Z, i.e., the flying direction.

To explain the displacement in the flying direction, suppose the position of the electromagnetic transducer 30 element 1 with no voltage applied on the displacement generating means to be indicated by 0. Consider here the case where the displacement of the electromagnetic transducer element 1 from +L1 to −L2 in the X-axis direction in FIG. 26 is continuously carried out by the application of voltage on the displacement generating means. Illustrated in FIG. 28 is a relation found at this time between the displacement of the electromagnetic transducer element 1 in the X-axis direction and time.

Figure 28:
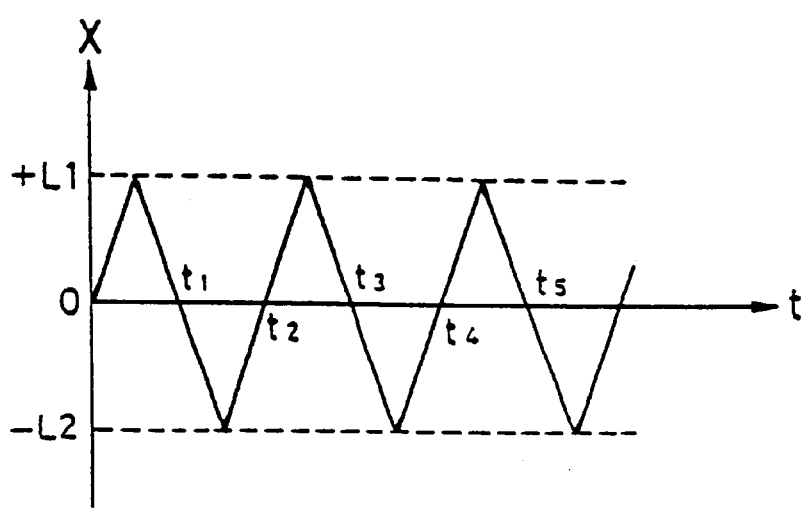
FIG. 28 is a graph showing a change-with-time of the displacement of the electromagnetic transducer element 1, shown in FIG. 26, in the X-axis direction.
Figure 29A:
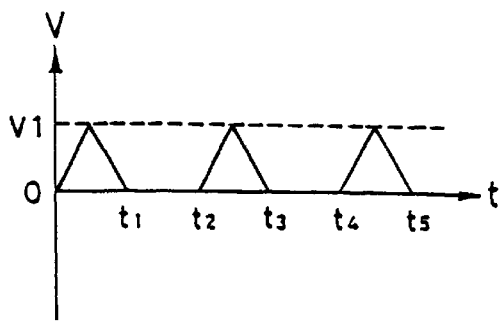
FIG. 29A is a graph showing a change-with-time of voltage applied on one displacement generating means in the actuator.
Figure 29B:
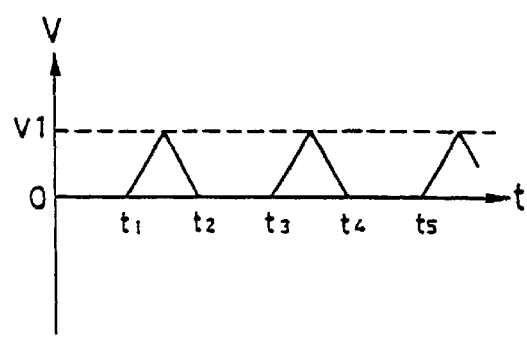
FIG. 29B is a graph showing a change-with-time of voltage applied on another displacement generating means in the actuator.

To allow the electromagnetic transducer element 1 to generate such a displacement in the X direction as shown in FIG. 28, consider here the case where voltage is alternately applied on the respective displacement generating means. In this case, it is required to apply on the displacement generating means 411 a voltage showing such a change-with-time as shown in FIG. 29A. On the other hand, it is required to apply on the displacement generating means 412 a voltage showing such a change-with-time as shown in FIG. 29B. It is noted that the applied voltage, when its direction is equal to the direction of polarization of the displacement generating means, is marked with a plus sign. Upon the application of voltage V1 on the displacement generating means 411, the electromagnetic transducer element effects a displacement of +L1 in the X-axis direction, and the application of voltage V1 on the displacement generating means 412, the electromagnetic transducer element 1 effects a displacement of −L2 in the X-axis direction. Thus, the displacement generating means 411 and 412 contract alternately, so that the electromagnetic transducer element 1 generates a displacement from +L1 to −L2 in the X-axis direction.

Then, consider displacement in the flying or Z-axis direction for each of two displacement generating means. The change-with-time of voltage applied on the displacement generating means 411 is illustrated in FIG. 29A, and the displacement part 411-1 contracts on the basis of this voltage. On the other hand, both coverings with this displacement part sandwiched between them do not contract because no voltage is applied thereon due to the fact that they are not sandwiched between electrode layers. This is also true even when the displacement part is made up of the piezoelectric or electrostrictive material layer. However, the coverings, because of being in close contact with the displacement part, is deformed incidental to the contraction of the displacement part. The covering 411-3 shown in FIG. 27 is more susceptible to deformation than the covering 411-2 having a relatively large width. Accordingly, upon the contraction of the displacement part 411-1, the movable part 44 displaces not only in a +X direction but also in a −Z direction. Consequently, the electromagnetic transducer element 1, too, displaces in the −Z direction. A change-with-time of the electromagnetic transducer element 1 in the Z-axis direction, which corresponds to the applied voltage shown in FIG. 29A, is graphically illustrated in FIG. 29C for instance. In this graph, the maximum value of displacement in the −Z direction is supposed to be Z1. The smaller the width difference between the upper and lower coverings with the displacement part sandwiched between them, the smaller is Z1, and vice versa.

Figure 29C:
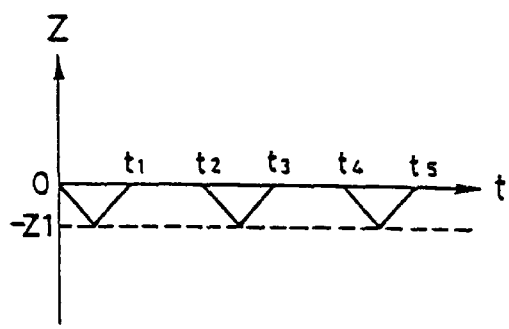
FIG. 29C is a graph showing a change-with-time of the displacement of the electromagnetic transducer element in the Z-axis direction upon the application of said voltage.
Figure 29D:
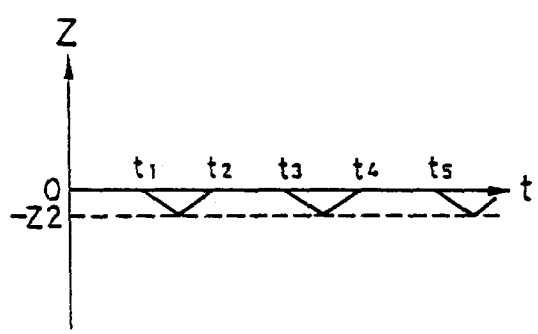
FIG. 29D is a graph showing a change-with-time of the displacement of the electromagnetic transducer element in the Z-axis direction upon the application of said voltage.

Similarly, a change-with-time of displacement of the electromagnetic transducer element 1 in the Z-axis direction upon the application of the voltage shown in FIG. 29B on the displacement generating means 412 is graphically illustrated in FIG. 29D. When, for instance, a width difference between the coverings 412-2 and 412-3 in one displacement generating means 412 is smaller than a width difference between the coverings 411-2 and 411-3 in another displacement generating means 411, the maximum value Z2 of displacement in the −Z direction is smaller than the aforesaid Z1.

Figure 29E:
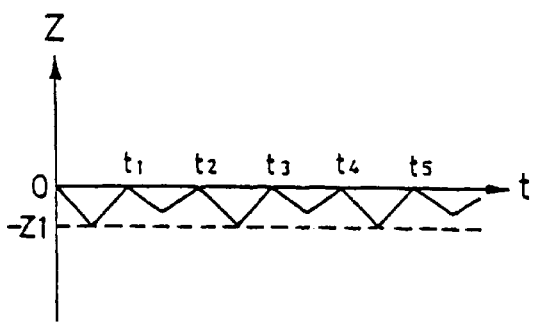
FIG. 29E is a graph showing a change-with-time of the displacement of the electromagnetic transducer element in the Z-axis direction upon the application of the voltage shown in FIG. 29A on one displacement generating means and upon the application of the voltage shown in FIG. 29B on another displacement generating means.

Accordingly, when the voltage shown in FIG. 29A is applied on the displacement generating means 411 and the voltage shown in FIG. 29B is applied on the displacement generating means 412, the change-with-time of displacement of the electromagnetic transducer element 1 in the Z-axis direction is the sum of that shown in FIG. 29C plus that shown in FIG. 29D; that is, it is illustrated in FIG. 29E. As illustrated, the maximum value of the magnitude of fluctuations in the Z-axis direction displacement is Z1.

When, as explained above, the displacement generating means has a multilayer structure wherein a displacement part that elongate and contract upon the application of voltage thereon and a pair of coverings with the displacement part sandwiched between them are stacked together in a direction vertical to the plane of a disk medium, displacement is not only generated in the aforesaid vertical direction, i.e., in the flying direction, but fluctuates as well. This in turn makes the read/write characteristics of the disk medium worse, and may possibly result in a head crash.

Then, a driving control method capable of controlling the magnitude of fluctuation in the flying direction displacement will be explained.

Figure 30A:
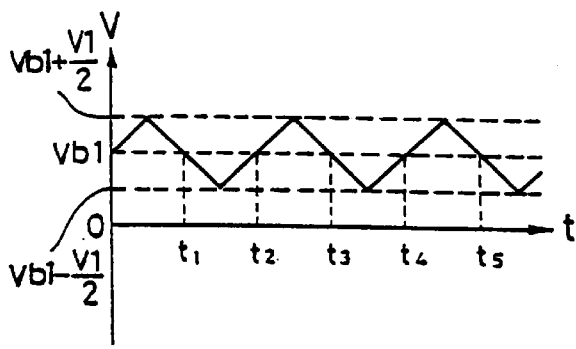
FIG. 30A is a graph showing a change-with-time of voltage applied on one displacement generating means in the actuator.
Figure 30B:
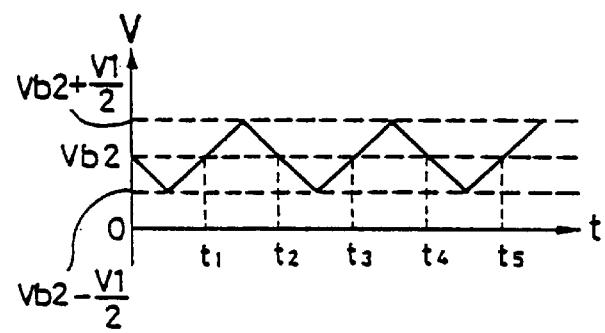
FIG. 30B is a graph showing a change-with-time of voltage applied on another displacement generating means in the actuator.

In the embodiment shown in FIG. 26, and 27, the displacement of the electromagnetic transducer element 1 in the X-axis direction takes the form of an applied voltage difference between the displacement generating means 411 and 412. To bring a change-with-time of displacement of the electromagnetic transducer element 1 in the X-axis direction in conformity with that shown in FIG. 28, therefore, it is preferable to bring a change-with-time of voltage applied on the displacement generating means 411 in conformity with that shown in FIG. 30A and a change-with-time of voltage applied on the displacement generating means 412 in conformity with that shown in FIG. 30B. The voltage applied on the displacement generating means 411 is the sum of a direct current bias voltage Vb1 plus a voltage applied for controlling the amount of displacement (the latter voltage will hereinafter be called control voltage), while the voltage applied on the displacement generating means 412 is the sum of a direct current bias voltage Vb2 plus the control voltage. In FIG. 30A, and 30B, the control voltage added in the displacement generating means 411 and the control voltage added in the displacement generating means 412 are determined in such a manner that their absolute values are always the same but their signs are opposite to each other. In other words, the sum of the voltage applied on the displacement generating means 411 plus the voltage applied on the displacement generating means 412, i.e., the total sum of voltages applied on the displacement generating means is always a constant value (Vb1+Vb2).

It is noted that the direct current bias voltage is to prevent any attenuation of polarization of the displacement generating means, as already mentioned.

For each of two displacement generating means, then consider displacement in the flying or Z-axis direction, just like the aforesaid embodiment. Suppose here that such voltages as shown in FIGS. 30A and 30B are applied on the displacement generating means 411 and 412, respectively, for their independent driving. Then, changes-with-time of the electromagnetic transducer element 1 in the flying direction are those shown in FIGS. 30C and 30D, respectively. The center value of fluctuations in the Z-axis direction displacement is shifted by the amount of displacement Zb1, and Zb2 due to direct current bias voltage, and so is −Zb1, and −Zb2, respectively. The magnitude of fluctuations in the displacement of each displacement generating means in the Z-axis direction is then given by Z1, and Z2, respectively, corresponding to V1 that is twice the amplitude of the control voltage.

Figure 30C:
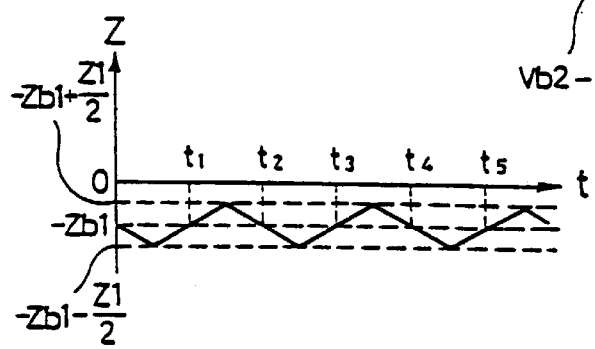
FIG. 30C is a graph showing a change-with-time of the displacement of the electromagnetic transducer element in the Z-axis direction upon the application of said voltage.
Figure 30D:
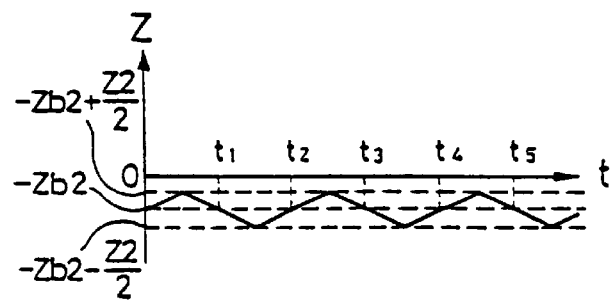
FIG. 30D is a graph showing a change-with-time of the displacement of the electromagnetic transducer element in the Z-axis direction upon the application of said voltage.
Figure 30E:
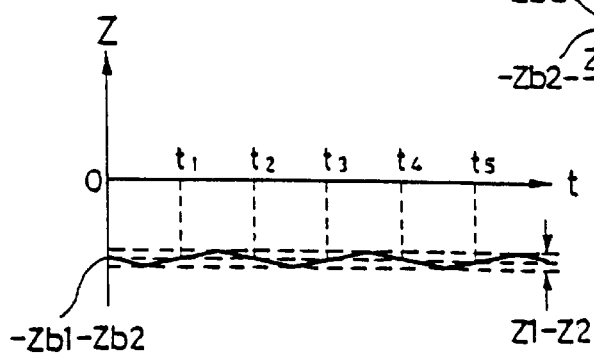
FIG. 30E is a graph showing a change-with-time of the displacement of the electromagnetic transducer element in the Z-axis direction upon the application of the voltage shown in FIG. 30A on one displacement generating means and upon the application of the voltage shown in FIG. 30B on another displacement generating means.

Accordingly, when the voltage shown in FIG. 30A is applied on the displacement generating means 411 and the voltage shown in FIG. 30B is applied on the displacement generating means 412, the change-with-time of displacement of the electromagnetic transducer element 1 in the Z-axis direction is the sum of that shown in FIG. 30C plus that shown in FIG. 30D; that is, it is shown in FIG. 30E. The displacement fluctuations shown in FIG. 30C, and 30D, respectively, result from the control voltage alone, and displacements due to the control voltage are set off because of their opposite phase relations. Thus, the magnitude of displacement fluctuations in FIG. 30E is given by a difference between Z1 and Z2. When the amplitudes of displacements Z1/2 and Z2/2 are equal to each other, the magnitude of fluctuations is 0, and the center value of displacement fluctuations is the sum of displacements −Zb1 and −Zb2 generated by direct current bias voltages. The direct current bias voltages Vb1 and Vb2 may or may not be equal to each other, and at least one may be zero or a negative voltage. Even in this case, it is preferable to use a voltage enough to prevent the aforesaid attenuation of polarization.

As explained above, when the direction of displacement of the electromagnetic transducer element 1 in the Z-axis direction is the same upon the application of voltage on the displacement generating means 411 and upon the application of voltage on the displacement generating means 412, it is possible to control the magnitude of fluctuations in the displacement of the electromagnetic transducer element 1 in the Z-axis direction by keeping the total sum of voltages applied on the displacement generating means constant.

In this connection, it is noted that the displacement o:E the electromagnetic transducer element in the Z-axis direction has been explained on the assumption that when the amount of displacement in the Z-axis direction varies at each displacement generating means, there is no distortion of the movable part. In an actuator fabricated by the shaping of the sheet-like member, indeed, its movable part is most unlikely to be distorted even when there is a difference in the amount of displacement in the Z-axis direction between each displacement generating means. However, even when the movable part is distorted, the advantages of the aforesaid driving control method are available. To minimize influences of the distortion of the movable part, it is preferable to locate the electromagnetic transducer element 1 at a substantially central position of the side of the slider 2, as shown in FIG. 26.

The foregoing explanation has been made on the premise that the actuator having the sectional shape shown in FIG. 27 is used; that is, the displacement of the electromagnetic transducer element 1 in the Z-axis (flying) direction occurs in the direction of −Z. However, when the sandblasting direction, for instance, is the direction of −Z, the trapezoidal shape in section of the displacement generating means is inverse to that shown in FIG. 27, so that the displacement of the electromagnetic transducer element in the Z-axis direction occurs in the direction of +Z. Even in this case, too, it is understood that the fluctuations of the Z-axis direction displacement can be controlled by use of the aforesaid driving control method although the direction of the fluctuations varies.

The embodiments described so far have been explained on the assumption that the electromagnetic transducer element 1 displaces (swing) in the X-axis direction at a constant amplitude and a constant period. When the aforesaid driving control method is employed, however, it is unnecessary to keep amplitude and period constant. In an actual HDD, the amplitude and period of displacement of its electromagnetic transducer element are variable because the electromagnetic transducer element displaces in such a manner that it follows given read/write tracks on a disk-like medium.

In accordance with the aforesaid driving control method, it is necessary to add the control voltages having the same absolute value but opposite signs to the direct current bias voltage Vb1, and Vb2, respectively, to generate driving voltage. However, such driving voltage can be easily generated by the positioning control circuit 7 and amplifier 8.

The aforesaid driving control method has an additional advantage of reducing loads on the positioning control circuit 7 because only the operation of one control signal is needed.

Figure 31:
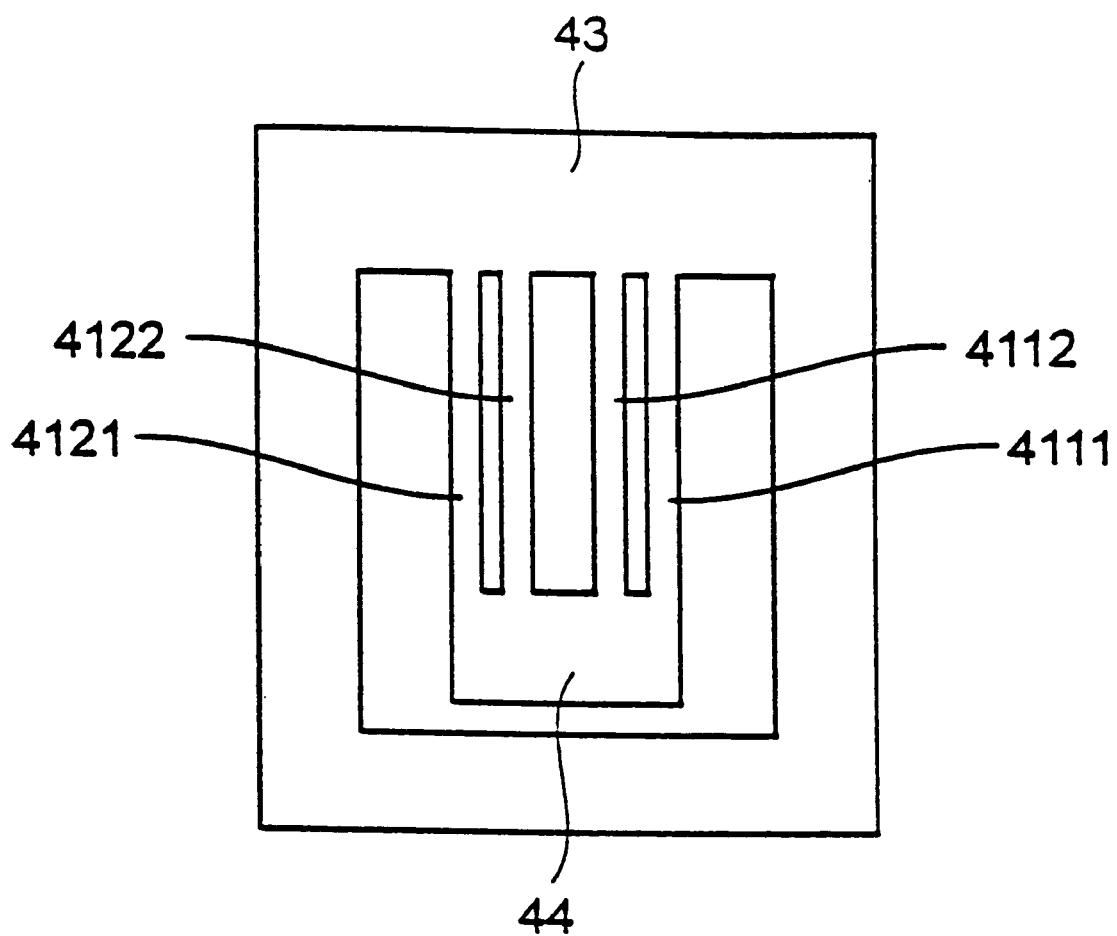
FIG. 31 is a plan schematic illustrative of an actuator comprising four displacement generating means.

The aforesaid driving control method is also effective even for an actuator having more than two displacement generating means. FIG. 31 illustrates an embodiment wherein four displacement generating means are used. To consider the operation of this embodiment, now suppose the displacement generating means 411 as already mentioned to be divided into 4111 and 4112 and the displacement generating means 412 to be divided into 4121 and 4122. Then, suppose one pair of displacement generating means 4111 and 4121 and another pair of displacement generating means 4112 and 4122, respectively. The sum of voltages applied on the respective pair is invariable at any time, and so the total sum of voltages applied on the displacement generating means is invariable at any time.

When more than two displacement generating means are used, it is acceptable to apply varying voltages on them. To control fluctuations in the displacement of the electromagnetic transducer element 1 in the flying direction, it is again required that the total sum of voltages applied on the displacement generating means be kept constant at any time. Assume here that the voltage applied on each displacement generating means is the control voltage plus direct current bias voltage. Then, the total sum of the aforesaid control voltages is zero.

It is noted that the number of displacement generating means is not limited to an even number such as 2 or 4, and so may be an odd number.

The foregoing explanation has been made on the premise that upon the application of voltages of the same polarization on the displacement generating means 411 and 412, displacements in the direction vertical to the direction of their elongation and contraction (in the aforesaid Z-axis direction) are in the same direction. For this case the aforesaid driving control method is most effective. Therefore, if the displacement of the displacement generating means in the Z-axis direction is unavoidable, it is then preferable to fabricate an actuator in such a manner that at least the displacement of each displacement generating means in the Z-axis direction is in the same direction. When an actuator is fabricated by the process as mentioned herein, it is difficult to eliminate the displacement of displacement generating means in the Z-axis direction, but it is easy to control the direction of their displacement in the Z-axis direction (bring the directions of displacement of both displacement generating means in the Z-axis direction in alignment with each other). That is, if sandblasting with respect to displacement generating means is in the same direction during the fabrication of the actuator 4 shown in FIG. 26 by the sandblasting shaping of a sheet-like member as explained above, the aforesaid driving control method can then function most effectively because both displacement generating means have much the same shape and much the same properties. In some cases, separately fabricated displacement generating means may be coupled to the fixed part 43 and the movable part 44, respectively, as by bonding. If, in this case, the coupling directions are controlled, the aforesaid driving control method can then function effectively.

While the driving control method according to the present invention has been explained with reference to the magnetic head of the structure shown in FIG. 26, it is understood that it may also be applicable to the actuator of the construction shown in FIG. 3, 6, 8, 9, 10, 11, and 12, respectively, for instance.

In the embodiment shown in FIG. 26, the displacements of the displacement generating means 411 and 412 in the Z-axis direction are often in opposite directions upon the application of voltages of the same polarity thereon. Even in this case, the magnitude of fluctuations in their displacement in the Z-axis direction is unlikely to increase, if the aforesaid driving control method is employed. Such opposite displacements in the Z-axis direction, for instance, may be caused when the sandblasting direction varies for each displacement generating means during the aforesaid sandblasting. Similar opposite displacements in the Z-axis direction may again occur, when between separately fabricated displacement generating means there is a difference in the direction of coupling them to the fixed part 43 and the movable part 44, respectively. An account will be given of the application of the aforesaid driving control method to an actuator in which opposite displacements of both generating means in the Z-axis direction occur.

Here assume that the voltage shown in FIG. 29A is applied on the displacement generating means 411 and the voltage shown in FIG. 29B is applied on the displacement generating means 412. Then, the magnitude of fluctuations in the displacement of the electromagnetic transducer element 1 in the Z-axis direction is given by the sum (Z1+Z2) of the maximum values of displacement in the Z-axis direction upon the application of voltage on each displacement generating means.

Also assume that the voltage shown in FIG. 30A is applied on the displacement generating means 411 and the voltage shown in FIG. 30B is applied on the displacement generating means 412. Then, the magnitude of fluctuations in the displacement of the electromagnetic transducer element 1 in the Z-axis direction is given by the sum of the magnitudes of displacement fluctuations upon the separate application of voltage on each displacement generating means because the fluctuations in the displacement of each displacement generating means are generated by the control voltage and the displacements of both displacement generating means in the Z-axis direction are in the same phase.

In short, when the displacements of both displacement generating means in the Z-axis direction upon the application of voltages of the same polarity thereon are in varying directions, the maximum value of the magnitude of fluctuations in the displacement of the electromagnetic transducer element 1 in the Z-axis direction upon the alternate application of driving voltage on each displacement generating means is the same as the maximum value of the magnitude of fluctuations in the displacement of the electromagnetic transducer element 1 in the Z-axis direction when the total sum of driving voltages applied on the displacement generating means is kept constant. In any cases, therefore, the maximum value of the magnitude of fluctuations in the Z-axis direction displacement is most unlikely to become large according to the aforesaid driving control method where the total sum of driving voltages applied on the displacement generating means is kept constant.

Experimental Example of the Driving Control Method

An actuator of the structure shown in FIG. 26 was made, using PZT (where the piezoelectric constant is $d_{31}=-250\times 10^{-12}$ m/V) as a piezoelectric or electrostrictive material and utilizing the aforesaid thick film process.

The actuator was a multilayer structure built up of eight piezoelectric or electrostrictive material layers, each having a thickness of 20 $\mu$m and electrode layers on both sides, and two coverings, one for the uppermost layer and another for the lowermost layer, ten layers in all (with a total thickness of 0.2 mm). Displacement generating means were each of a trapezoidal shape in section, and 1 mm in length and 0.2 mm in thickness, covering width was 0.05 mm at least and 0.15 mm at most, the pitch between both displacement generating means was 0.2 mm, and the displacement generating means were subjected to polarization treatment.

When a voltage of 20 V was applied on this actuator in the same direction as the direction of polarization, the amount of contraction of the displacement generating means was about 0.2 μm and the displacement of the movable part in the X-axis direction was about 0.5 μm, and when a half-wave sine wave form of voltage of 0 to 20 V was alternately applied on both displacement generating means, the displacement of the movable part in the X-axis direction was about ±0.5 μm and the magnitude of fluctuations in the displacement thereof in the Z-axis direction was about 0.1 μm.

On the other hand, when voltage was applied on the two displacement generating means, said voltage having sine waves, in opposite phases at an amplitude of 10 V, superposed on a direct current bias voltage of 10 V, the displacement of the movable part in the X-axis direction was about ±0.5 μm, and the magnitude of fluctuations in the displacement thereof in the Z-axis direction was reduced to 0.01 μm or lower (lower than the limit to measurement).

The above results clarify the advantages of the present invention wherein when the actuator is in operation, the total sum of voltages applied on the displacement generating means is kept constant at any time.

What we claim is:

1. A read/write head comprising:
    a slider including an electromagnetic transducer element or an optical module, an actuator, and a suspension, wherein:
    said slider is supported on said suspension via said actuator, said actuator comprises a planar monolithic piece of piezoelectric or electrostrictive material having a fixed part, a movable part and at least two beam parts for connecting said fixed and movable parts together, at least one of said two beam parts having a displacement generating means that elongates and contracts under an inverse piezoelectric force or an electrostrictive force in a direction connecting said fixed part and said movable part, said fixed part being fixed to said suspension and said movable part being fixed to said slider,
    upon elongation and contraction of said displacement generating means, said displacement generating means deflects and said movable part displaces linearly, circularly or rotationally with respect to said fixed part, and said electromagnetic transducer element or said optical module displaces in a direction intersecting recording tracks on a recording medium in a linear or circular orbit, and
    said fixed part, said movable part and said beam parts are formed by a hole and/or a cutout in the planar monolithic piece.

2. The read/write head recited in claim 1, wherein said actuator is located on a back or side surface of said slider.

3. The read/write head recited in claim 2, wherein said actuator is located in a space formed by a step provided on the back surface of said slider.

4. The read/write head recited in claim 2, wherein said slider and said actuator are opposed to each other with said suspension sandwiched therebetween.

5. The read/write head recited in claim 3, wherein said slider and said actuator are opposed to each other with said suspension sandwiched therebetween.

6. The read/write head recited in claim 2, wherein a part of said suspension is provided with a gimbal member for allowing said slider to follow a surface of said recording medium, and said actuator is coupled to said gimbal member.

7. The read/write head recited in claim 1, wherein said slider and said actuator are opposed to each other with said suspension sandwiched therebetween.

8. The read/write head recited in claim 7, wherein a part of said suspension is provided with a gimbal member for allowing said slider to follow a surface of said recording medium, and said actuator is coupled to said gimbal member.

9. The read/write head recited in claim 1, wherein at least two piezoelectric or electrostrictive material layers, each having electrode layers on both sides, are provided at said displacement generating means in said actuator.

10. The read/write head recited in claim 1, wherein an amount of displacement of said electromagnetic transducer element or said optical module is larger than an amount of elongation and contraction of said displacement generating means in said actuator.

11. The read/write head recited in claim 10, wherein the amount of displacement of said electromagnetic transducer element or said optical module is larger than an amount of displacement of a juncture between said slider and said actuator.

12. The read/write head recited in claim 10, wherein the amount of displacement of said juncture between said slider and said actuator is larger than the amount of elongation and contraction of said displacement generating means in said actuator.

13. The read/write head recited in claim 1, wherein an interconnection line with respect to said actuator and/or said electromagnetic transducer element or said optical module is formed at said suspension.

14. A read/write head positioning mechanism comprising a read/write head as recited in claim 1, and a main actuator for driving the whole of said read/write head.

15. A read/write system comprising a read/write head as recited in claim 1 or a read/write head positioning mechanism as recited in claim 11.

16. A mechanism for positioning a read/write head comprising:
    a slider including an electromagnetic transducer element or an optical module, an actuator, and a suspension, wherein:
    said slider is supported on said suspension via said actuator,
    said actuator comprises a planar monolithic piece of piezoelectric or electrostrictive material having a fixed part, a movable part and at least two beam parts for connecting said fixed part and said movable part together, said at least two beam parts each having a displacement generating means that elongates and contracts under an inverse piezoelectric force or an electrostrictive force in a direction connecting said fixed part and said movable part, said fixed part being fixed to said suspension and said movable part being fixed to said slider,
    upon elongation and contraction of said displacement generating means, said displacement generating means deflects and said movable part displaces linearly, circularly or rotationally with respect to said fixed part, and said electromagnetic transducer element or said optical module displaces in a direction intersecting recording tracks on a recording medium in a linear or circular orbit, said mechanism further comprises means for controlling, upon positioning said electromagnetic transducer element or said optical module in a direction intersecting said recording tracks, a total sum of driving voltages applied to said displacement generating means to keep said total sum of driving voltages constant, and said fixed part, said movable part and said beam parts are formed by a hole and/or a cutout in the planar monolithic piece.

17. The read/write head positioning mechanism recited in claim 16, wherein:

a direction of elongation and contraction of each displacement generating means is invariable with respect to an applied voltage having the same polarity, and a voltage applied on each displacement generating means is a voltage having a control voltage added to a direct current bias voltage, and the total sum of said control voltages added to said displacement generating means is controlled in such a manner that said total sum is always zero.

18. The read/write head positioning mechanism recited in claim 16, wherein:

each of said displacement generating means comprises a displacement part that elongates and contracts by an applied voltage and a pair of coverings between which said displacement part is sandwiched, said displacement part and said coverings being stacked in a direction vertical to a surface of a recording medium, and said coverings are in close contact with said displacement part, and are deformed upon elongation and contraction of said displacement part.

19. The read/write head positioning mechanism recited in claim 16, wherein said read/write head is a read/write head as recited in claim 1.

20. The read/write head positioning mechanism recited in claim 12, which further comprises a main actuator for driving the whole of said read/write head.

* * * * *

UNITED STATES PATENT AND TRADEMARK OFFICE
CERTIFICATE OF CORRECTION

PATENT NO.    : 6,246,552 B1
DATED         : June 12, 2001
INVENTOR(S)   : Yoshiikazu Soeno et al.

It is certified that error appears in the above-identified patent and that said Letters Patent is hereby corrected as shown below:

Column 42,
Line 12, change "7" to -- 1 --.

Signed and Sealed this

Fifth Day of August, 2003

JAMES E. ROGAN
*Director of the United States Patent and Trademark Office*